United States Patent [19]
Ristow et al.

[11] Patent Number: 5,754,187
[45] Date of Patent: *May 19, 1998

[54] METHOD FOR DATA COMPRESSION OF DIGITAL DATA TO PRODUCE A SCALEABLE FONT DATABASE

[75] Inventors: Allan W. Ristow, Salem, N.H.; Thomas B. Hawkins, Groton, Mass.

[73] Assignee: Agfa Division, Bayer Corporation, Wilimington, Mass.

[*] Notice: The term of this patent shall not extend beyond the expiration date of Pat. No. 5,734,388.

[21] Appl. No.: 242,941

[22] Filed: May 16, 1994

[51] Int. Cl.⁶ .................................................. G06T 11/00
[52] U.S. Cl. ........................................ 345/469; 345/472
[58] Field of Search ................................ 395/150, 151, 395/467–172; 345/141–144

[56] References Cited

U.S. PATENT DOCUMENTS

| | | | |
|---|---|---|---|
| 4,675,830 | 6/1987 | Hawkins | 395/138 |
| 4,933,866 | 6/1990 | Markoff et al. | 395/150 |
| 5,189,730 | 2/1993 | Kajimoto | 395/142 |
| 5,257,016 | 10/1993 | Fujii et al. | 345/143 |

Primary Examiner—Joseph R. Burwell
Attorney, Agent, or Firm—Richard J. Birch

[57] ABSTRACT

A method for construction of a scaleable font database comprised of data stored in a compact form for retrieval in one of several usable forms common in digital typography. The method comprises the steps, for each text character of a font collection of: generating a digital representation of the character and identifying it with respect to character code and typeface design, determining segment endpoints and associations within a model of the character, measuring actual dimensions for the associations, and determining segment descriptors for each contour segment comprising the complete outline of the character.

12 Claims, 14 Drawing Sheets

CG Times  Courier  Albertus Medium
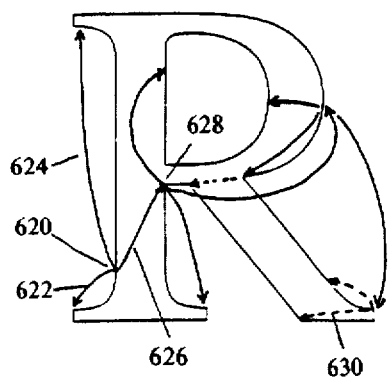 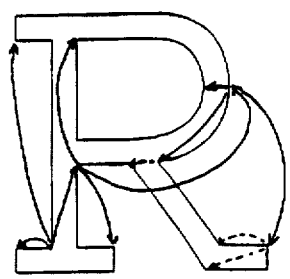 
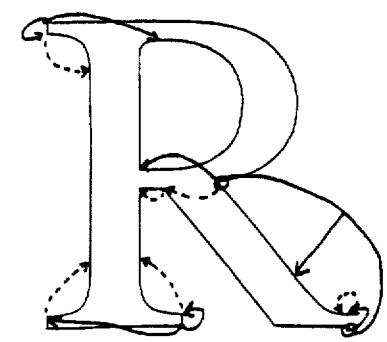 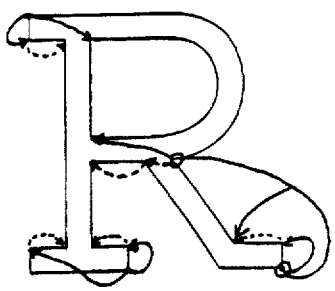 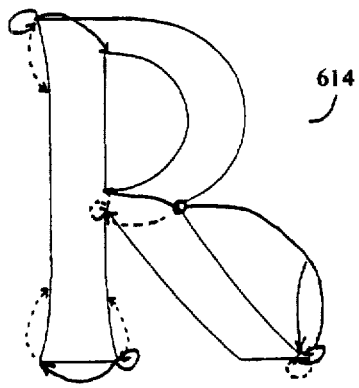
FIG. 6

| | | |
|---|---|---|
| Model 1 | HHH | CG Times |
| | HHH | CG Times Bold |
| | HHH | Courier |
| | HHH | Courier Bold |
| Model 2 | HHH | Univers Medium |
| | HHH | Univers Bold |
| | HHH | Univers Medium Condensed |
| | HHH | Univers Bold Condensed |
| Model 3 | *HHH* | Univers Medium Italic |
| | *HHH* | Univers Bold Italic |
| Model 4 | *HHH* | Univers Medium Condensed Italic |
| Model 5 | *HHH* | CG Times Bold Italic |
| Model 6 | *HHH* | CG Times |
| Model 7 | HHH | CG Omega |
| Model 8 | *HHH* | CG Omega Italic |
| Model 9 | HHH | Garamond Antiqua |
| Model 10 | *HHH* | Garamond Kursiv |
| Model 11 | *HHH* | Coronet |
| Model 12 | HHH | Marigold |

FIG. 12A

| | |
|---|---|
| HHH | Albertus Medium |
| HHH | Albertus Extra Bold |
| HHH | Clarendon Condensed |
| HHH | Letter Gothic |
| HHH | Letter Gothic Bold |
| HHH | Antique Olive |
| HHH | Antique Olive Bold |
| *HHH* | Letter Gothic Italic |
| *HHH* | Antique Olive Italic |
| *HHH* | Univers Bold Condensed Italic |
| *HHH* | Courier Italic |
| *HHH* | Courier Bold Italic |
| HHH | CG Omega Bold |
| *HHH* | CG Omega Bold Italic |
| HHH | Garamond Halbfett |
| *HHH* | Garamond Kursiv Halbfett |

FIG. 12B

METHOD FOR DATA COMPRESSION OF DIGITAL DATA TO PRODUCE A SCALEABLE FONT DATABASE

CROSS-REFERENCE TO RELATED APPLICATION

The present application is related to the application of Allan W. Ristow and Thomas B. Hawkins for "Method and Apparatus for Font Data Storage and Retrieval", filed simultaneously herewith and assigned to the same assignee.

BACKGROUND OF THE INVENTION

The field of the invention is the storage, object manipulation, and image processing for output presentation of graphic objects, and more particularly, of text graphic objects in digital typography. Representation of typographic data in digital form involves two problems which are well known in the art.

The first of these problems is the loss of detail accuracy which must inevitably occur in the transfer of the (analog) "master" design created by a typeface design artist to digital form. Quantization effects, even at very high scanning resolutions, provide visual distortion of otherwise smoothly flowing lines. As a result, the close approximation of the "master" by a dataset of originally-scanned data requires a very large amount of storage. In the earliest forms of digtal typography, for example, storage and display methods were based upon bitmaps, which are simple to store, retrieve, and display. This early methodology, however, consumes a significant amount of storage space if many character (point) sizes or output resolutions are to be supported by the character output device.

An alternate approach is to convert the originally-scanned quantized data into a connected set of mathematically-defined boundaries of two-dimensional regions representing the "inside" or "outside" of a character. The boundaries are comprised of "curve elements" which, in the most primitive implementations, are simple line segments. More sophisticated systems use more complex shapes such as quadratic or cubic Beziér curves. All of these systems have the objective of storage of these mathematical shapes, and reconstruction of the digital representations of the characters through properly constructed physical mechanisms or computer instructions. A major benefit to the mathematical description is the ability to render output characters at any size by scaling the coordinate information stored in the character data descriptions, thereby eliminating the need for storage of bitmap data at every desired point size and/or output resolution. An added benefit of a mathematical description is the ability to subdivide the original outline into as many "curve elements" as necessary and to store the data representing them at whatever precision is required for replication of an original "master" design to the degree permitted by the scanning resolution. Once again, however, the more closely the outline representation of the scanned data approximates the original design, the larger the dataset describing the outline. This is referred to as the "high resolution" problem with digital representation of typographic data.

The second problem well known in the art of digital typography is the "low resolution" problem, in which the quantization of an analog design causes visual distortion and other effects resulting from misalignment with the two-dimensional raster "grid" on which the result is to be rendered for display or recording on an output medium. At lower resolutions such as those used for current "desktop" printing and video display devices, simple scaling of the character outlines produces unacceptable results. The problem is manifested in the scaling of mathematically-defined character outlines to low point sizes relative to the raster grid. Typical misalignment effects include loss of symmetry or "stem dropout" within individual characters, different appearance of supposedly identical character shapes due to differing phase with respect to the grid, and misalignment of a (horizontal) line of text or of a (vertical) column of characters.

The "low resolution" problem of digital typography has been addressed by the methodology hereinafter referred to as "hint-based scaling", and is well described in Hawkins U.S. Pat. No. 4,675,830 (herein incorporated by reference). The process developed in the Hawkins patent, along with others aimed at similar objectives, over-rides the normal scaling process and repositions many of the points of the character outline boundaries (thereby causing some pixels which would otherwise be "off" to be turned "on" and vise versa). This repositioning is meant to produce a more pleasing and harmonious collection of text characters at any given size and output resolution. The process is based upon data added to the character outline data, referred to in the art as "hint data" which establishes standard relationships globally defined for a given typeface design, along with those within individual characters, and uses them to adjust the shape of the contour of each character to fit the output grid as it is rendered. A successful implementation of this methodology is the INTELLIFONT scaleable font database offered by Agfa Division of Miles Inc. ("INTELLIFONT" is a trademark of Miles Inc.). Variations on the technique can be found in the POST-SCRIPT "Type 1" font scaling technology offered by Adobe Systems Inc. ("POST0SCRIPT" is a trademark of Adobe Systems Inc.), and the TRUETYPE font system offered by Apple Computer, Inc., and Microsoft, Inc. ("TRUETYPE" is a trademark of Apple Computer, Inc.). These technologies have in common the fact that additional data is included for every scaleable font, and for every character of a scaleable font, to provide the hint data. Moreover, a considerable amount of effort is spent in designing and applying this hint data to the character outlines meant for general use in computing systems.

From the above discussion it is clear that faithful representation of digital typographic data in both the "high resolution" and "low resolution" domains requires a significant amount of data, since both detailed outline information and hint data are present. The original purpose of providing a scaleable representation of text graphic objects, namely the reduction in storage requirement, has been compromised by the need to include additional data to modify the scaling process at commercially-required output resolutions. The fact that rendering speed is a major requirement for efficient display and output involving text means that the data storage vs. runtime computation tradeoff tends towards increasing the storage requirement in order to minimize runtime computation. The above considerations, together with the demand for a larger variety of typeface designs in everyday applications such as desk-top publishing point to an ever increasing storage requirement for font data. A typical scaleable font stored in the format of the INTELLIFONT system requires 40–70 Kbytes of storage. For an environment using 200 scaleable fonts, a requirement of 8–14 MBytes is indicated for data storage only. Accordingly, the need exists for efficient font storage and retrieval mechanisms which minimize the data storage requirement, supporting high-speed scaling, manipulation and rasterization, and at the same time meeting the quality requirements of both "high resolution" and "low resolution" domains.

Methods for compression of font data sets are well known in the prior art. To place them in perspective and to understand better the objectives and features of the invention, the information content of typographic data is reviewed, along with the means by which data compaction can be accomplished with minimal loss of required information.

The outline of a character in a typeface design represents two distinct forms of information conveyed to a human viewing the character on a display device or output medium. The first is the typeface design-independent character "glyph", which distinguishes a letter "A" for example, from a letter "B". The second form of information is the typeface design-dependent "style" of the character, which distinguishes a letter "A" produced in the TIMES typeface design from one produced in HELVETICA ("TIMES" and "HELVETICA" are trademarks of Linotype AG and/or its subsidiaries). In hint-based scaling, both forms of information are used, the first to ensure that the character glyph is recognizable, and the second to ensure that a consistent typeface design "look" is achieved. There is in general substantial redundancy contained within the outline of a character, since it is the essence of good type design that many features distinguishing a typeface design are invariant from character to character. In the case of digitally-rendered text, the only additional information conveyed is the aesthetic appearance of characters optimally aligned to the grid of the output medium.

Content-based data compaction involves removing (or minimizing) redundancy, as opposed to non-content based methods which recode or reformat data. Methods for content-based compaction of typographic data fall into three categories:

1. Using full outline character descriptions to infer hints using a rule-based procedure, and applying these inferred hints to a scaling process;
2. Using typeface design-dependent hints only, reconstructing the outline using a standard predetermined set of character glyphs; and,
3. Factoring the typeface design-dependent and typeface design-independent information and retaining only a minimum set to represent both.

Methods for data compression by content compaction have been available for years, differing in the ways in which the redundant and non-redundant information are stored. An early electronic example from the 1960's is the "Nixie tube" and later embodied in LCD displays, in which any displayable graphic is made up of a combination of pre-defined "strokes", each of which is present or not (i.e., "on" or "off" in the Nixie tube), thereby allowing any possible graphic to be represented as a binary number of order n where n is the number of available "strokes". Since the set of strokes is fixed, such a system provides at most $_2n$ unique character glyphs, effectively representing only a single "font".

Another example can be found in the "turtle" graphics of the MIT Logo Laboratory, in which a complete complex outline is described as a sequence of primitive pen-based operations tracing a line. This approach was extended in the POST-SCRIPT rendering of graphic shapes. In these methods, a large descriptive dataset is replaced by a procedural description, i.e., a "program" which will, when executed, generate the outline.

Two current commercial examples of data compression by content compaction are the INFINIFONT and PANOSE products offered by ElseWare Corp., Seattle, Wash., and the FONTCHAMELEON product, offered by Ares Software, Foster City, Calif. For a description of these products, see "The HardCopy Observer", May 1993, pp. 17–22, and "Seybold Report on Desktop Publishing", Volume 8, Number 2, October 4, 1993.

The original PANOSE system was developed in the mid 1980's as an aid to font classification for the purpose of font substitution. The original system classified 240 typeface designs in terms of a 7-digit "PANOSE NUMBER" with each digit describing one visual typeface design characteristic (e.g., the kind of serifs, position mid lines, etc.). The system was later expanded to the present form representing quantitatively a total of 36 characteristics of a typeface design. The information content of the expanded PANOSE NUMBER provided the means for font substitution by matching PANOSE NUMBERS. In addition, the system provided for the dynamic construction of fonts using generic "stick figure" glyphs for each character as the starting point and using the 36 parameters for determining stem weight, serif shape, curvature, etc. The method was further expanded as the INFINIFONT product, to provide for reconstruction of character outlines approximating generic typeface designs.

The heart of INFINIFONT is a set of software modules called a "TERAFONT". A TERAFONT comprises, as an interpreted "program", a description applicable to a large number of similar typeface designs, for example, those of Latin-based alphabets. With only a PANOSE NUMBER for a given typeface design, execution of the TERAFONT at runtime produces a font meeting the generic specification. Addition of typeface design and character-specific information to the 36 parameters of the PA-NOSE NUMBER permits an approximation of an actual typeface design (including scaling hint information if available) with accuracy limited only by the size of the additional data supplied.

The FONTCHAMELEON product incorporates one or more "master fonts" and more than 200 typeface design descriptors that reshape the master font to simulate popular typeface designs such as TIMES and HELVETICA. Each master font comprises outlines containing as control points all those required to define any of the typeface design style variations supported by the master. For Latin alphabets, at least two master fonts are required: one for non-italic and the other for italic styles. The individual typeface design descriptors define only those required for a given typeface, leaving the remainder unused as redundant points. Each master font requires about 200 KB of storage, and each typeface design descriptor uses about 3 Kbytes of disk space.

Still another approach to compaction and dynamic font construction is the linear interpolation of previously stored character forms as implemented in the IKARUS typeface design system ("KARUS" is a trademark of URW, AG) and as disclosed in Markoff and Deubert U.S. Pat. No. 4,933,866. In this approach, two forms (e.g., one designated "expanded" and the other "narrow") are pre-stored as pre-defined sets of contour points with differing actual locations in the plane of the output medium. A linear interpolation procedure, carried out point-by-point creates a new outline which lies between the two extremes. This procedure allows a theoretically infinite number of new fonts to be created from two originally stored, using only a single scaling parameter given for each coordinate direction. As a result, the method provides flexible run-time creation of new fonts, but only as linear combinations of those already stored.

The above methods in the prior art have in common the compression of font data by content information compaction to a varying degree. The INFINIFONT and FONTCHAMELEON systems both replace individual typeface designdependent character outlines with one or more master outline data or procedural descriptions from which approximations of character outlines are constructed on-the-fly by typeface design- and character-dependent descriptors. Use of the minimum descriptor information, e.g., the PANOSE NUMBER, results in a generic approximation of a typeface design, while still requiring the master outline in the form of the TERA-FONT. In the method of Markoff and Deubert, two fixed sets of outline data are used to create a third. In each method, at least one outline structure is required in addition to supporting data in order to achieve faithful character reconstruction. Since the outline requires significant storage, the degree of compaction is limited by the number of fonts which can successfully be described by the same outline information.

A second area of commonality of the prior art methods, including the INTELLIFONT scaleable font database methodology and those described above, is the redundancy of data stored for representation of both the outlines (or their content compacted equivalent representation) and the hint data which indicate where the boundaries should really be. Even "auto-hinting" methods aimed at construction of hint data from given outline data make the assumption that there exists a substantial information overlap between the outlines and the hints. These auto-hinting methods, although reducing the storage needed for the added hint data, still require the full definition of a character outline. The reverse approach, i.e., the use of a hint data description as the basis both for reconstruction of a character outline and for hint-based scaling, is unknown in the art.

It is accordingly a general object of the invention to store and retrieve digital data representing graphic objects in forms usable for display or recording on an output medium at any resolution and object size.

It is a specific object of the invention to store and retrieve digital typographic data in scaleable form suitable for generation of pixelmaps fit to the grid of an output medium, at any resolution and point size.

It is a further specific object of the invention to store and retrieve digital typographic data in scaleable form suitable for use as hinted character outlines for reproduction at any point size with grid alignment to an output medium.

It is a still further specific object of the invention to maintain digital typographic data in a form which preserves the distinguishing features of each character and each typeface design while minimizing the size of the stored dataset in the data storage medium.

It is a general feature of the invention that the time required for processing of the stored digital typographic data to a form suitable for display or output recording is comparable to or less than that required for that of other methods known in the art It is a specific feature of the invention that the time required to produce a single character bitmap from the stored form is faster than producing the same bitmap from an outline font stored in prior art formats.

It is a further specific feature of the invention that characters having an arbitrary shape can be added to a font collection by straightforward data entry procedures.

It is a still further specific feature of the invention that the visual aspects of a typeface design can be reproduced to a high level of quality without compromise of the minimal storage or processing time objectives.

It is another further specific feature of the invention that the storage and retrieval process is independent of any specific font scaling technology, provided that the information content of the font database is at least sufficient for the level of reproduction accuracy required.

It is still another further specific feature of the invention that new fonts can be synthesized from an existing font database by systematic modification of the parameters associated with one or more typeface designs.

SUMMARY OF THE INVENTION

The present invention is a method and apparatus for data compression of digital data representing graphic objects, and is particularly applicable to digital typographic data due to the structural inter-relationships associated with graphic objects in typography. The method is based upon the recognition that there are two data sets which independently describe the outline of a character in a scaleable font: the outline points themselves; and the hint data which is used to determine where the outline points end up after scaling and pixelmap grid-alignment Because much of the same information is contained in both datasets, the outline data set is replaced by a data set which more closely resembles the hint data than that of the outlines.

In the method of the invention, a "character model" is abstracted from the data for an actual character by separating the information describing the actual contour outline from the "associations" between pairs of specially-selected contour outline points. Rather than attaching an actual (typeface design-dependent) measurement, i.e., dimension, to each such association, an abstract form of the association is created by assigning a (character-dependent, but typeface design-independent) dimension name such as "horizontal cap stem" or "vertical curve stem". Dimensional data applicable to an entire collection of characters for a given typeface design can be stored once for the superset of abstract dimensions applicable to the typeface design instead of for each character of the collection, due to the fact that a horizontal cap stem for any character of a given typeface design has similar physical dimensions when rendered in the output medium.

In addition to the character model capturing the associations, parametric descriptions are created for each contour segment, i.e., each portion of the character outline extending between adjacent pairs of reference outline points, called "segment endpoints", that are linked by the associations. These parametric descriptions, referred to as "segment descriptors", indicate the form of a contour segment (line, quadratic Beziér curve, Beziér curve, etc.) and include the minimum number of reference outline points necessary to reconstruct it accurately given the actual positions of the segment endpoints when rendered in the output medium.

The character model forms a set of "shapeless" contour loops. This set is analogous to a network of knotted strings, with the "knots" being the segment endpoints, and the "strings" connecting them representing the segment descriptors. The shapeless network takes on the actual shape of a character when, and only when, the positions of the "knots" are defined (by assigning actual typeface design-dependent dimensions to the distances between them), and the "strings" connecting them are laid down according to the segment descriptors and thus made "rigid". Accordingly, the data for a complete character description for any given typeface design is separated into three subsets:

1. A character model which captures the associations applicable to the equivalent characters of a large number of similar typeface designs;
2. Measurements for each of the dimensions defined for the associations within the character model; and,
3. Segment descriptors for the contour segments connecting adjacent segment endpoints.

Of the above subsets the first is stored for each character only once for a single collection of "similar" typeface designs. The data in the remaining two subsets is stored either once globally if it pertains to a number of typeface designs, or within the "character local data" if it is unique to a specific character.

The most general procedure for reconstruction of a character outline for a particular font stored according to the above character data description involves three steps:

1. The dimensions are applied to the associations within the character model, thereby obtaining the actual locations of the segment endpoints;
2. The segment descriptors, together with the segment endpoints determined in step 1, are used to reconstruct the actual contour segment between each successive pair of segment endpoints making up the character outline; and,
3. The reconstructed contour segments are used for output of the complete character outline, either as a rasterized grid-aligned pixelmap or in another form usable in digital typography.

The above processing steps are similar to those occurring in a typical hint-based scaling process. However, in this case they are being used, without the necessity of added computation time, for three objectives: (1) decompression; (2) scaling; and, (3) grid-alignment if desired.

Finally, since the dimension and segment descriptor data subsets can be stored separately, it is possible to manipulate them individually or in combination to effectively synthesize new scaleable fonts based on those originally stored.

The method differs from those of the prior art in several important ways. First, NO master outline dataset is required in addition to typeface design-specific character descriptions. The second distinction is that reproduction of any character can be achieved to meet industry standards for faithful reproduction of the typeface design, without approximation or necessary addition of a significant amount of character-specific data. The third distinction is that characters having an arbitrary shape can be added to a font collection without revision of existing data structures or processing systems.

BRIEF DESCRIPTION OF THE DRAWINGS

The objects and features of the invention will best be understood from a detailed description of a preferred embodiment thereof selected for the purposes of illustration and shown in the accompanying drawings:

FIG. 6 shows a character model example given for the letter "R" in three different typeface designs;

FIG. 12 shows the result of character outline reconstruction for the letter "H" for 35 typeface designs using a set of 12 models; and, FIG. 13 shows a data processing flowchart for construction of a character database according to the method of the invention.

DETAILED DESCRIPTION OF THE INVENTION

The fact that character outlines can be completely reconstructed without the use of a master outline is based upon the process of "factoring" of redundant information. This can best be understood by considering the information contained in a character to be factored as the "union" of character "glyph" shape information, dimensions of standard parts such as stems, caps, etc., physical associations between portions of a character which are preserved over a range of point sizes and resolutions, and outline topology considered as a sequence of curve segments. Redundancy occurs within a group of typeface designs when all instances of the same character glyph shape differ only by one or more of the other information components. Similarly, redundancy occurs when a group of characters belonging to the same typeface design have the same standard dimensions and differ only by glyph shape and outline topology. In these cases, the redundant components can be factored out and made separate from the information which is represented by data stored for individual characters. Several examples exist for the factoring of information:

1. Dimensions can be factored out of character models and made font global (as done presently in INTELLIFONT, POSTSCRIPT, TRUETYPE);
2. Associations can be factored across many typeface designs for a single character glyph shape. For example, many instances of the letter "H" have the same basic model, but different dimensions;
3. Outline topology can be factored across many characters just as associations;
4. Segment endpoints can be recovered from associations and dimensions provided that the association structure is rich enough. Some segment endpoints need to be described by data which is specific to the character to which it applies; and,
5. The factoring of curve segments into endpoints and curve descriptions allows the essence of the curve to be described in a compact form. The actual curve can be derived from this curve description and the endpoints. This approach is successful because, for line segments and simple curve elements, the endpoints form a significant amount of the information needed to describe the curve segment. These curve descriptions provide further information factoring in the form of a single curve description applicable to many actual curve segments.

DESCRIPTION OF A PREFERRED EMBODIMENT

Figure 1:
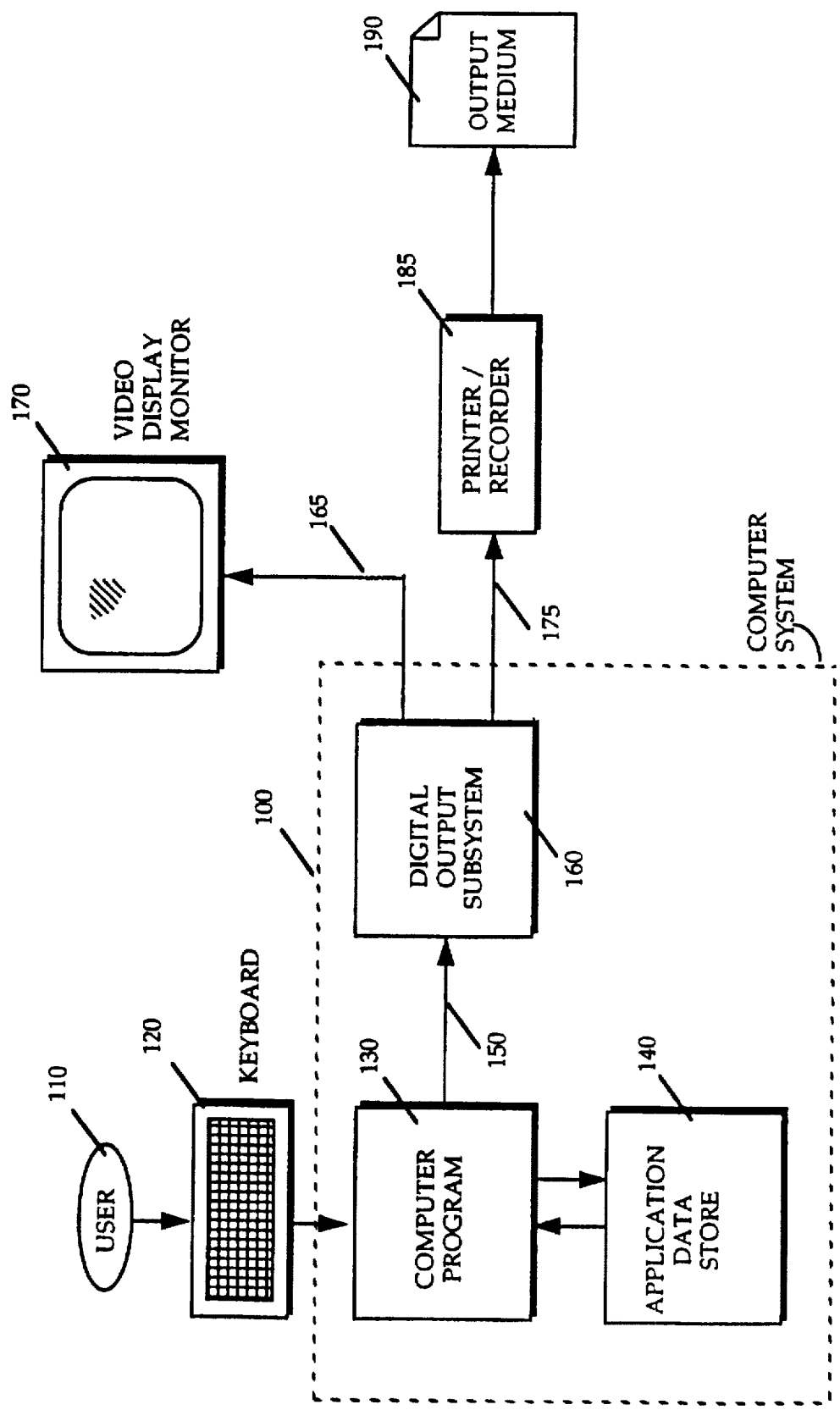
FIG. 1 shows a system context diagram for the preferred embodiment of the invention.

Turning now to the drawings, an implementation of a computer system using the method and apparatus of the invention will be described in detail. FIG. 1 shows a typical application context of this system, in which a user 110 uses a keyboard 120 to access a computer 100 containing a computer program 130. The computer program 130 can be a process which reads from or writes to a data store 140, and can operate with varying degrees of user interaction, including no interaction after startup. In the typical application environment shown in FIG. 1, the computer program 130 can generate output 150 in the form of text and graphics for display on a video display monitor 170, as well as for output to a device 185 (hereinafter referred to as a "printer") for printing or recording on an output medium 190 such as paper or film. The output 150 of the computer program 130 is encoded as a sequence of digital signals which are converted into electrical signals for output to a physical output device. This conversion is carried out by a digital output subsystem 160, in which the signals 150 are converted into a form 165 for output to display monitor 170 or a form 175 for output to the printer 185.

Defined Terms

As an aid to understanding the discussion to follow, the terms defined herein apply to the following text and claims, and are indicated by small capitalization. A CHARACTER is a graphic object conveying information such as typographical information, having a visually recognizable appearance. A TYPEFACE DESIGN is a specific set of CHARACTERS originally produced by an artist, conveying a particular visual style which is shared by all CHARACTERS of the same TYPEFACE DESIGN. A FONT is a collection of CHARACTERS having the same TYPEFACE DESIGN and point size (e.g., "12 point TIMES-ROMAN Bold Italic"). A SCALEABLE FONT is the data representation of FONTS of the same TYPEFACE DESIGN such that CHARACTERS can be obtained from the same data over a range of point sizes. A TYPEFACE comprises the set of TYPEFACE DESIGNS having common design elements, e.g., the TYPEFACE "HELVETICA" comprises the TYPEFACE DESIGNS "HELVETICA", "HELVETICA Bold", "HELVETICA Italic", "HELVETICA Narrow" etc.

A STORED CHARACTER is a data representation of all information used to process and display a single CHARACTER at a single resolution and point size. A STORED SCALEABLE CHARACTER is a data representation of all information used to process and display a single CHARACTER over a range of point sizes and resolution values according to a given scaling technology. A FONT DATABASE is a plurality of STORED CHARACTERS. A SCALEABLE FONT DATABASE is a plurality of STORED SCALEABLE CHARACTERS. A CHARACTER SET is a set of identification codes according to a number system (such as unicode numbers) each of which uniquely identifies a recognizable CHARACTER in a TYPEFACE DESIGN-independent and style-independent manner. The CHARACTER CODE is the unique identification code of a single character within a CHARACTER SET.

Figure 2A:
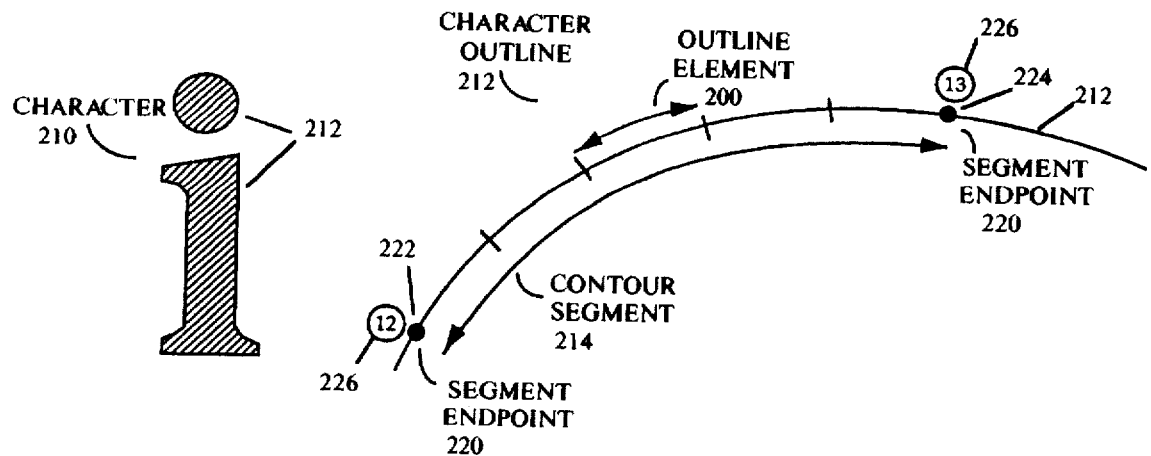
FIG. 2A and FIG. 2B illustrate defined terms used in the detailed description of the invention.

The following defined terms are illustrated in FIG. 2A. An OUTLINE ELEMENT 200 is a single straight or curved line segment that is used to define a portion of the boundary of a CHARACTER 210. Examples of OUTLINE ELEMENTS well known in the art include straight line segments, quadratic Bezier curve segments, and cubic Beziér curve segments. The CHARACTER OUTLINE 212 is a collection of OUTLINE ELEMENTS 200 which completely determines the boundary of the CHARACTER. A CONTOUR SEGMENT 214 is a sequence of one or more OUTLINE ELEMENTS 200. SEGMENT ENDPOINTS are the endpoints of a CONTOUR SEGMENT (see for example the specific points 222 and 224 in FIG. 2A). A SEGMENT ENDPOINT NUMBER 226 is a number assigned to each of the SEGMENT ENDPOINTS 220 in a CHARACTER OUTLINE 212 sequentially increasing in the order that they follow each other along the CHARACTER OUTLINE 212.

A NORMALIZED CONTOUR SEGMENT is a CONTOUR SEGMENT described relative to fixed starting and ending points which are the same for all NORMALIZED CONTOUR SEGMENTS. A SEGMENT DESCRIPTOR is the set of parameters which, in addition to the fixed starting and ending points, completely defines a CONTOUR SEGMENT.

Figure 2B:
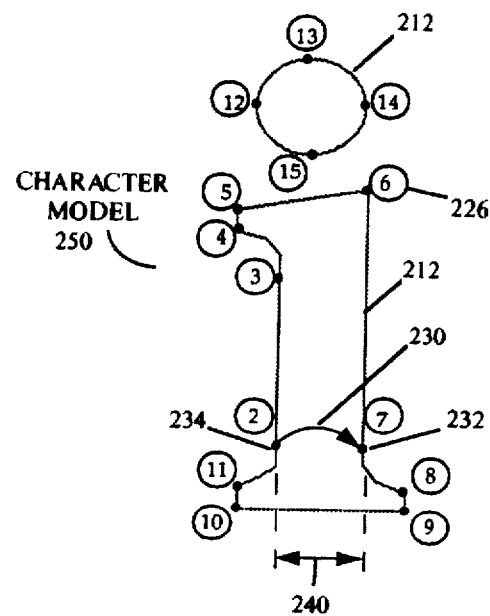

The following definitions are illustrated in FIG. 2B. An ASSOCIATION is a function which determines the position of a SEGMENT ENDPOINT. A SPATIAL ASSOCIATION is an ASSOCIATION whereby the position of a SEGMENT ENDPOINT is given as a function of a fixed distance, a given direction, and the location of another SEGMENT ENDPOINT. For example, the SPATIAL ASSOCIATION 230 gives the position of SEGMENT END POINT 232 as a displacement by a fixed distance from the SEGMENT ENDPOINT 234 in the direction shown by the arrow. A NON-SPATIAL ASSOCIATION is any association which is not a SPATIAL ASSOCIATION.

A DIMENSION 240 is a numeric quantity corresponding to the (TYPEFACE DESIGNdependent) fixed distance parameter of a SPATIAL ASSOCIATION. A CHARACTER MODEL 250 is the collection of all SEGMENT ENDPOINT NUMBERS 226 and ASSOCIATIONS defined for a given CHARACTER 230. It should be noted that a CHARACTER MODEL 250 is an abstraction of information. Different CHARACTERS 210 can be fitted with CHARACTER OUTLINES 212, SEGMENT ENDPOINTS 220 and ASSOCIATIONS 230 such that they correspond to the same CHARACTER MODEL 250.

A PIXELMAP is a (typically two-dimensional) array of elements each corresponding to one resolution element of the output display or recording device (referred to as a PIXEL), and each having a single value to be output for that resolution element by the device. A special case of a PIXELMAP is a BITMAP, wherein the single value assigned to each element can take on one of two values (referred to herein as "black" or "white"). The PIXELMAP GRID is the grid, defined by the resolution of the output device, which contains the PIXELMAP.

PIXELMAP GRID ALIGNMENT is the process of adjusting a CHARACTER OUTLINE at low resolutions and point sizes to obtain the best fit of the CHARACTER OUTLINE to the PIXELMAP GRID when viewed singly and together with other characters.

Character Generator Module

Figure 3:
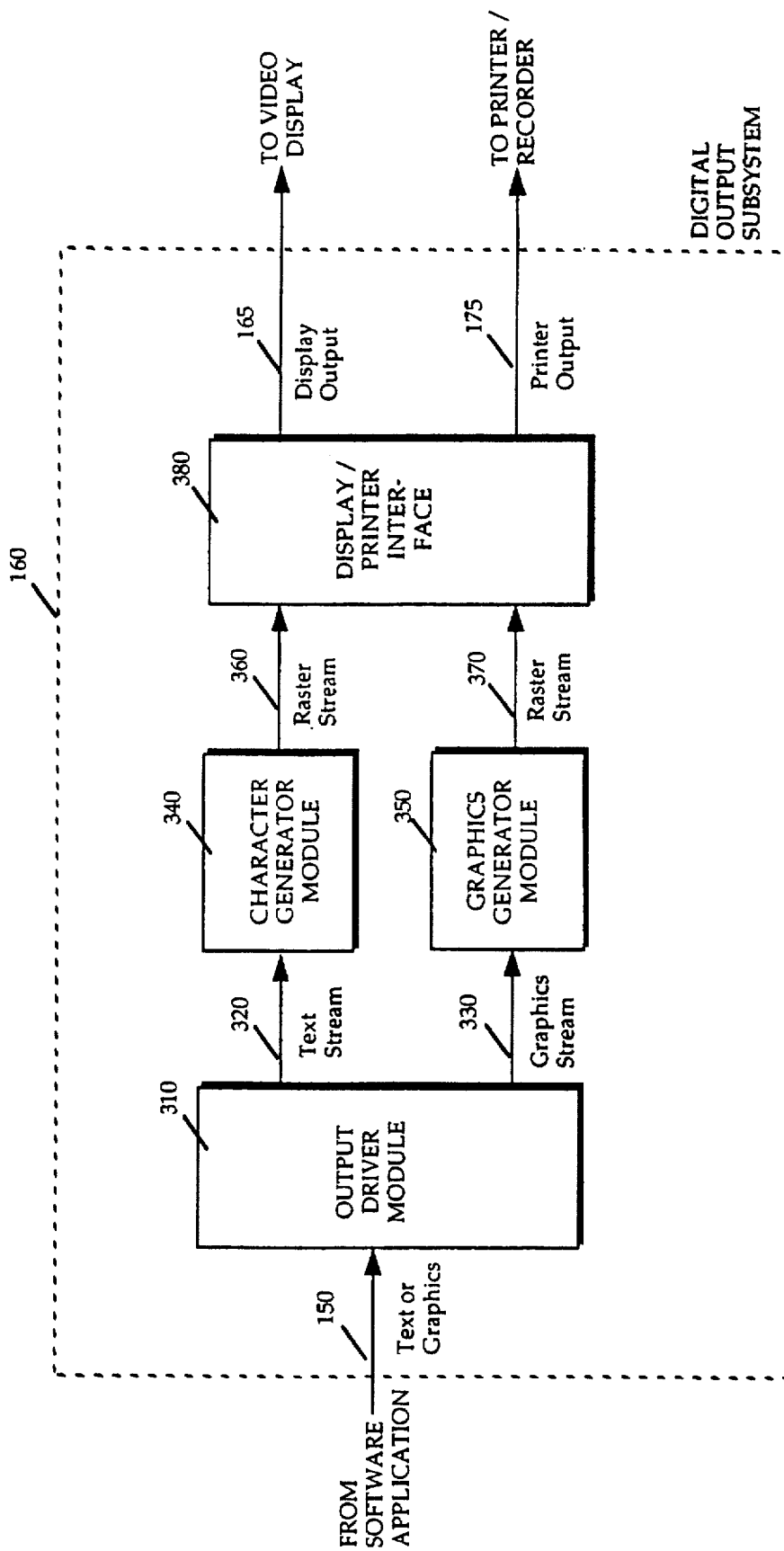
FIG. 3 shows a block diagram of the data flow and processing sequence of the digital output subsystem.

The digital output subsystem 160 of FIG. 1 is shown as a block diagram in FIG. 3. The diagram shows the data flow and processing carried out in the conversion process from digitally-encoded text or graphics 150 to the electrical data and control signals used for display output 165 or printer output 175. An output driver 310 first separates the streams of digital signals for text and graphics into a text stream 320 and a graphics stream 330. The text stream 320 is processed by a character generator 340 thereby producing a raster data stream 360, encoded as digital signals representing PIXELS in a PIXELMAP for display or printing. The graphics stream 330 is processed in a similar fashion using a graphics generator module 350, which produces a raster data stream 370 similar to the raster data stream 360 produced for the text stream 320 by the character generator 340. The raster data streams 360 and 370 are merged and converted into electrical signals 165 and 175 in the display/ printer interface module 380.

Implementations of the output driver module 310, graphics generator module 350, and display/ printer interface 380 all use methods well known in the art and need no further discussion. The method and apparatus of the present invention are embodied within the character generator module 340, for which a data flow and processing diagram is shown in block form in FIG. 4. The incoming text stream 320 is used by an outline reconstruction module 410 to retrieve font data 420 from a font data store 430. In the preferred embodiment of the invention, the font data store 430 is a SCALEABLE FONT DATABASE, but it is noted again that a FONT DATABASE can be used as well provided the information content is sufficient to support the method. The outline reconstruction module 410 uses the method of the invention to generate CONTOUR SEGMENTS 440 for the text characters of the text stream 320. The CONTOUR SEGMENTS 440 are processed by a rasterization module 450 which generates their PIXELMAP representation and converts it to the serial raster output 360.

Although the present discussion and examples given for the preferred embodiment of the invention assume output for rasterization in PIXELMAP form, i.e., as a set of CONTOUR SEGMENTS the coordinates for which can be mapped directly to the PIXELMAP GRID by the raster output module 450, it is also possible to store the contour segment data 440 as a hinted outline font 470 in a standard format such as TRUETYPE, POSTSCRIPT, or INTELLIFONT.

Figure 4:
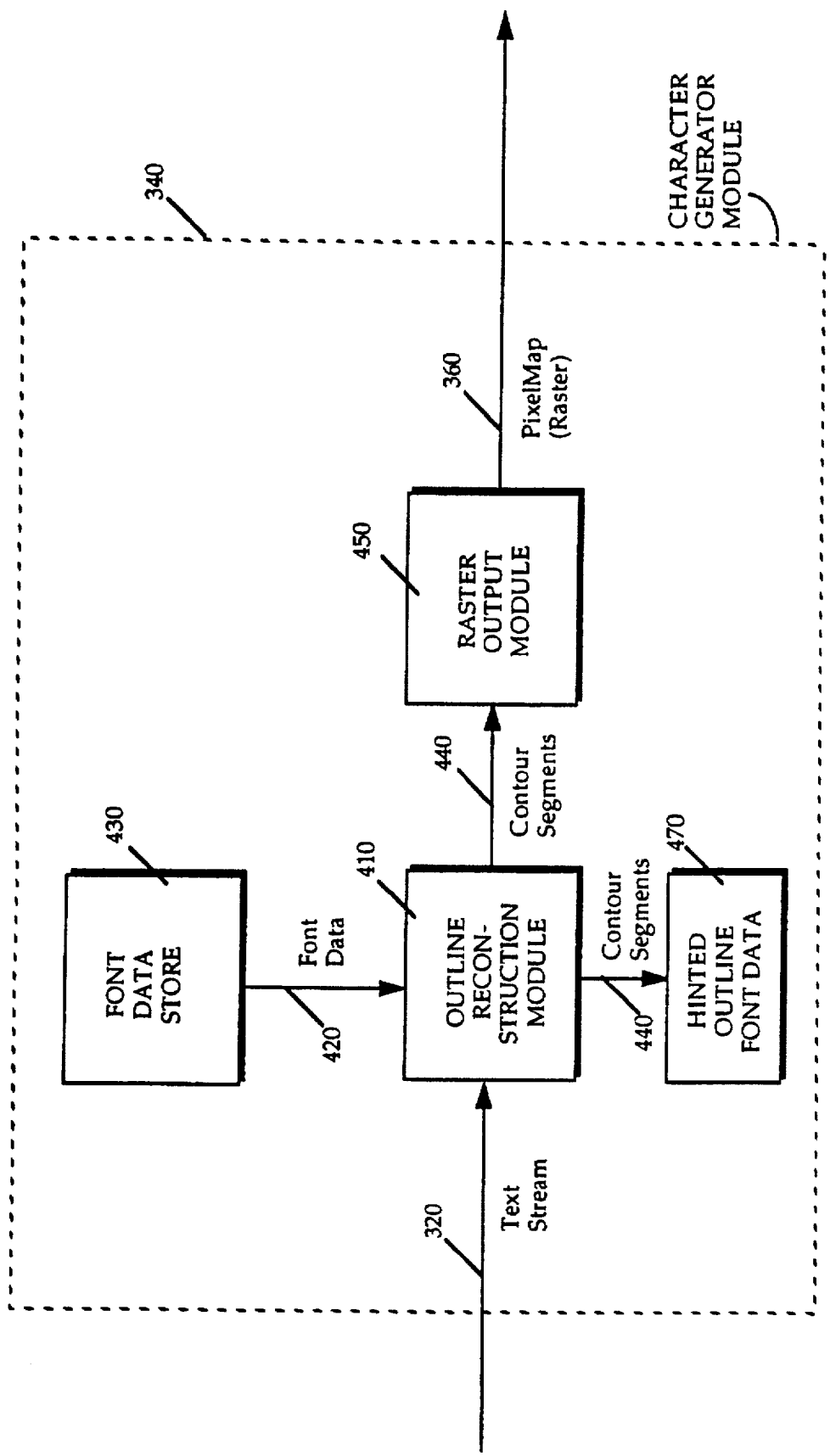
FIG. 4 shows a block diagram of data flow and processing sequence of the character generator module.
Figure 5:
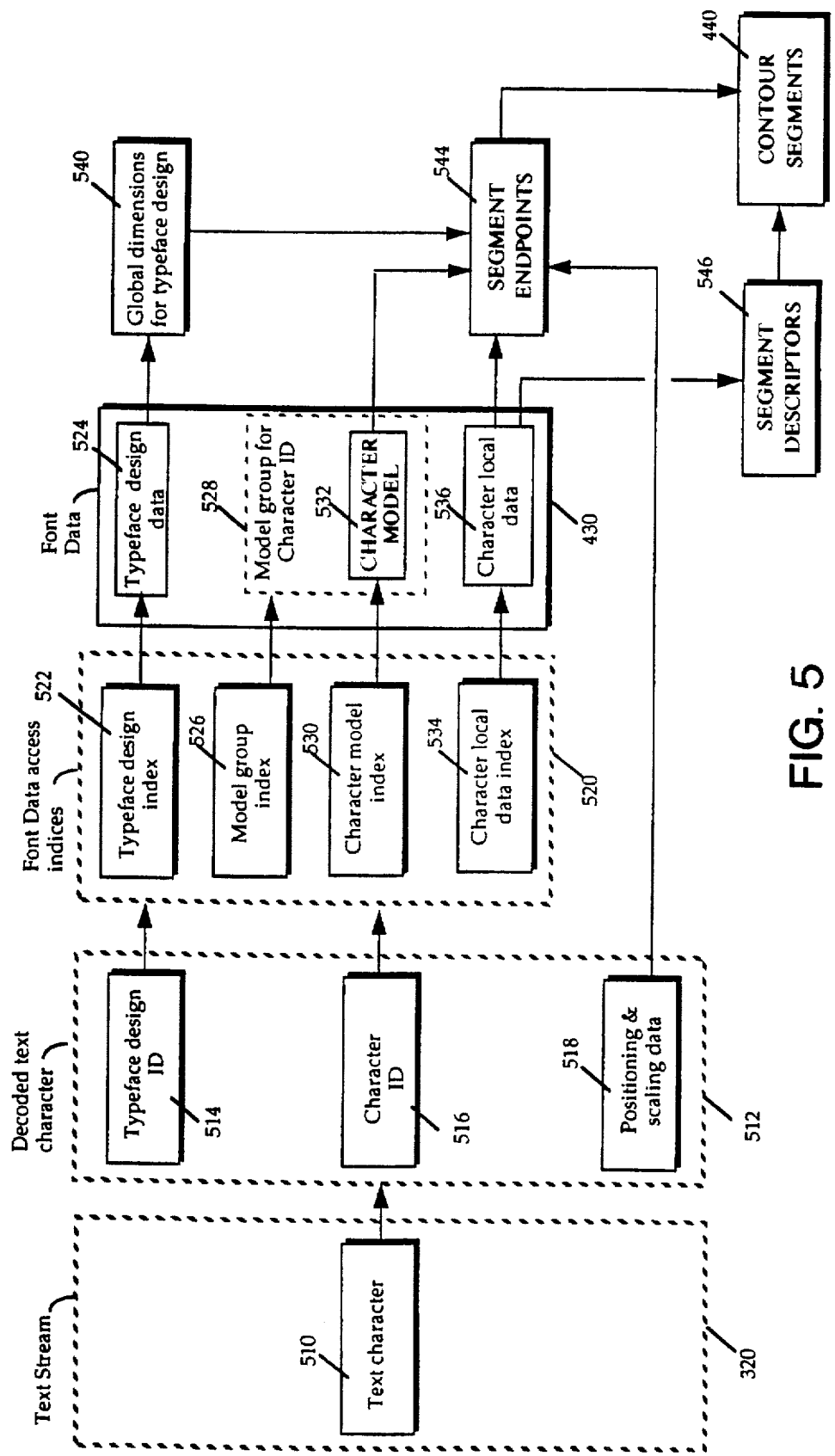
FIG. 5 shows the data flow in the conversion of a text character to grid-aligned scaled contour segments.

FIG. 5 summarizes the transformation of a text character from digitally encoded form to a grid-aligned CHARACTER OUTLINE for output as a rasterized PD(ELMAP. The text stream 320 is made up of a sequence of digitally-encoded text characters 510 each of which is identified according to TYPEFACE DESIGN, CHARACTER CODE, and other information used for rendering at the desired position and size in the output medium. The decoded text character 512 contains a typeface design ID 514 uniquely identifying the typeface family, weight, style, etc., a character ID 516 which is the CHARACTER CODE for the CHARACTER, and positioning and scaling data 518 referencing the CHARACTER to an output coordinate system. For output as a rasterized PIXELMAP, this is the PIXELMAP GRID for the output medium. The combination of typeface design ID 514 and character ID 516 is further decoded through the use of translation tables (not shown) to obtain a set of indices 520 providing access to the font data 420 of FIG. 4. The typeface design index 522 permits retrieval of the TYPEFACE DESIGN-specific (global) data 524. The model group index 526 identifies a model group dataset 528 containing data for all available CHARACTER MODELS corresponding to the character ID 516 of the text character 510. The character model index 530 identifies the actual CHARACTER MODEL 532 within the model group 528 to be used for the CHARACTER OUTLINE reconstruction for the text character 510. Finally, the character local data index 534 provides access to character local data 536 specific to the combination of the typeface design ID 514 and the character ID 516.

The typeface design data 524 includes the DIMENSIONS 540 to be applied globally to the set of ASSOCIATIONS for all character ID's 516 for the TYPEFACE DESIGN given by the typeface design ID 514. The character local data 536 contains DIMENSIONS for locally defined (CHARACTER MODEL-specific) ASSOCIATIONS along with the parameters for the SEGMENT DESCRIPTORS. The use of data defined locally permits customization of character shapes to an arbitrary degree. In the preferred embodiment of the invention, ASSOCIATIONS which are used in less than three CHARACTER MODELS are generally defined locally as an efficient tradeoff between local and global storage requirements.

The global dimensions 540, together with the character local data 536 are applied to the CHARACTER MODEL 532 to produce scaled and (if so indicated in the CHARACTER MODEL data) grid-aligned SEGMENT ENDPOINTS 544. The CONTOUR SEGMENTS 440 are obtained by applying the SEGMENT DESCRIPTORS 546 obtained from the character local data 536, typeface global data 540, or fixed within the CHARACTER MODEL 532.

In the event that the output of the character generator module 410 is used for generation of hinted or unhinted outline fonts in an industry-standard format, the CONTOUR SEGMENTS 440 are converted to the target outline data storage format. If the outline font is to be hinted, the CHARACTER MODEL 532 and the global dimensions 540 are converted to the target hint data storage format and added to the outline data.

Segment EndPoint Reconstruction

FIG. 6 shows a graphic representation of a single CHARACTER MODEL as it applies to the letter "R" in three different TYPEFACE DESIGNS, shown in three columns, and designated as "CG TIMES" (a trademark of Miles Inc., Agfa Division), "COURIER" (not a trademark), and "ALBERTUS MEDIUM" (a trademark of Monotype, Inc.) respectively. The top row 610 shows the actual printed character that is to be stored digitally in a scaleable, compressed form. The middle row 612 and bottom row 614 show some of the topological elements of the CHARACTER MODEL. The horizontal components 612 and vertical components 614 have been separated for clarity. These components are shown in a more detailed view in FIG. 7 and FIG. 8 for the same CHARACTER MODEL. In FIG. 6, the ASSOCIATIONS are represented as solid or dashed lines which are connected in "tree" form, with the arrows indicating the direction of traversal through the tree structure. For the horizontal associations 612, for example, a first node 620 has three ASSOCIATIONS 622, 624, and 626, the last of which traverses to the next node 628. Dashed lines indicate associations involving one or more nongrid-aligned points (e.g. the association 630). It is clear from FIG. 6 that although the printed CHARACTERS 610 are significantly different in visual appearance, the same set of associations appear in the horizontal elements 612 and vertical elements 614 of the CHARACTER MODEL, thereby illustrating the "knotted string" metaphor used previously to describe the CHARACTER MODEL in terms of a set of "shapeless loops".

Figure 7:
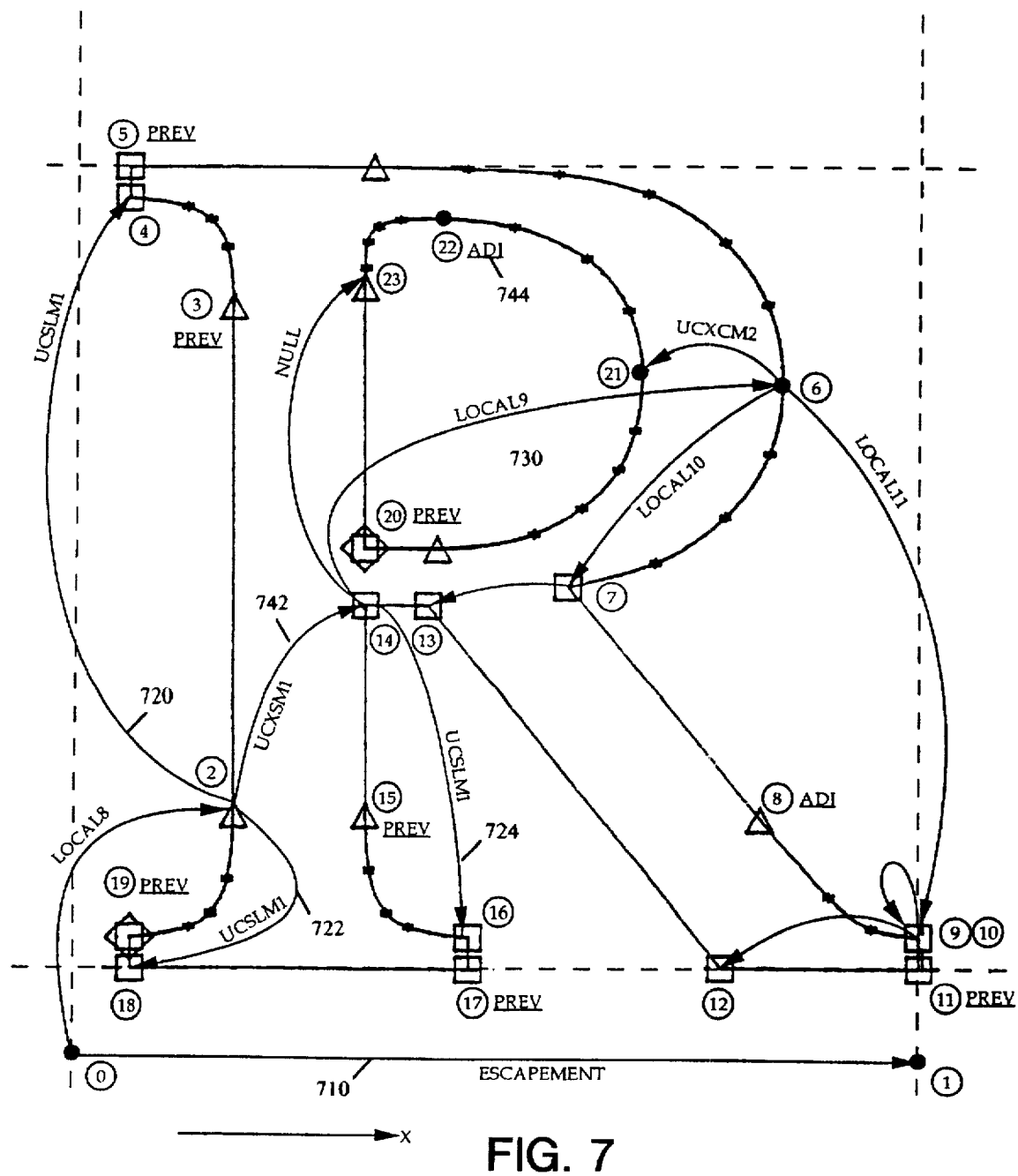
FIG. 7 shows a detailed view of the horizontal elements of the character model of FIG. 6.

FIG. 7 shows the detailed view of the horizontal elements of the CHARACTER MODEL of FIG. 6. In the Figure, the positions of reconstructed SEGMENT ENDPOINTS are shown with their designated SEGMENT ENDPOINT NUMBERS and are referred to in the following discussion as "point n" where n is a SEGMENT ENDPOINT NUMBER. For example "point 20" refers to the position of the reconstructed SEGMENT ENDPOINT having a designated SEGMENT ENDPOINT NUMBER equal to 20. The ASSOCIATIONS are indicated labeled with a symbolic name to be discussed in more detail below. SEGMENT ENDPOINTS connected by ASSOCIATIONS in the horizontal direction can all be reached from point 2 by following ASSOCIATIONS from point to point (points 0 and 1 define the character escapement 710, while points 2 through 23 refer to actual SEGMENT ENDPOINTS on the CHARACTER OUTLINE.

Also shown in FIG. 7 are examples of NON-SPATIAL ASSOCIATIONS. Those SEGMENT ENDPOINTS marked "PREV" are assumed to take on the same x-coordinate value as the previous SEGMENT ENDPOINT, e.g., point 17 has the same x-coordinate as the x coordinate calculated for point 16. The SEGMENT ENDPOINTS marked "ADJ" take on an x-coordinate value determined by the ratio of the reconstructed x-coordinates of the points before and after along the CHARACTER OUTLINE. For example, the x-coordinate of point 22 is determined by the fraction of the horizontal distance between points 23 and 21, as indicated by the parameter stored for the "ADJ" ASSOCIATION.

The symbolic names given to the ASSOCIATIONS refer to either global DIMENSIONS (defined on a TYPEFACE DESIGN basis), or local DIMENSIONS (defined only for this CHARACTER MODEL). For example, the symbolic name "UCSLM1" given to the ASSOCIATION 720 is a mnemonic name standing for "upper case serif length measure 1". This dimension is used to measure the serif width of CHARACTERS such as "I", "H", etc., and is used three times in the "R" model of FIG. 7, for the ASSOCIATIONS 720,722 and 724. The DIMENSION corresponding to UCSLM1 is stored only once in a global dimension table within the TYPEFACE DESIGN-specific data (524 and 540 of FIG. 5).

Local dimensions are DIMENSIONS which apply only to a unique ASSOCIATION within a single CHARACTER, and are stored in the character local data for that CHARACTER. They are given the symbolic names "LOCAL1", "LOCAL2", etc. See for example the ASSOCIATION 730 having the symbolic name "LOCAL9".

Each labeled SPATIAL ASSOCIATION within the CHARACTER MODEL, whether assigned a global or local DIMENSION, has a sign indicating the direction (plus or minus) in the coordinate direction (horizontal direction in FIG. 7) of the next point As has been described previously, the actual values of the DIMENSIONS for a particular TYPEFACE DESIGN are used to measure the distances between SEGMENT ENDPOINTS. These values can be scaled so as to produce the desired character size relative to a given PIXELMAP GRID (determined by the requested character point size and the resolution of the output device). The calculated coordinate values for those SEGMENT ENDPOINTS to be used for the purpose of PIXELMAP GRID ALIGNMENT can be rounded to whole PIXEL values. The information as to whether or not a given SEGMENT ENDPOINT is to be grid aligned is one of the parameters of the ASSOCIATIONS contained in the CHARACTER MODEL.

The processing sequence used for reconstruction of the horizontal coordinates is summarized in the following steps:

1. The starting x-coordinate is taken to be point 0 and its value is set to 0.
2. The DIMENSION for the SPATIAL ASSOCIATION "LOCAL8" 740 is retrieved from the character local data, scaled, and added to the x-coordinate of point 0 to obtain the x-coordinate of point 2. The x-coordinate value of point 2 can be PIXELMAP GRID ALIGNED if called for by a parameter of that ASSOCIATION.
3. The DIMENSION for the SPATIAL ASSOCIATION "UCSLM1" 720 is retrieved from the DIMENSION data specific to the TYPEFACE DESIGN, scaled, and subtracted from the x-coordinate of point 2 to obtain the x-coordinate of point 4 (which can be PIXELMAP GRID ALIGNED if called for). As described previously, addition or subtraction of the DIMENSION value is determined by the DIMENSION sign stored in the CHARACTER MODEL.
4. Step 3. is carried out repeatedly to determine x-coordinate values of each SEGMENT ENDPOINT from previously-determined x-coordinates and local or global dimensions.
5. Once all SEGMENT ENDPOINTS with SPATIAL ASSOCIATIONS have been located according to the above steps, the x-coordinate values of all SEGMENT ENDPOINTS labeled "PREV" are set to the x-coordinates of the previous points on the contour (e.g. the x-coordinate value of point 3 is set to that of point 2).
6. Finally, the x-coordinate values of all SEGMENT ENDPOINTS labeled "ADJ" take on the x-coordinate value determined by a fraction of the horizontal distance between the reconstructed x-coordinates of the SEGMENT END-POINTS previous and following along the contour. That fraction value is retrieved from character local data for the CHARACTER. As an example, point 22 uses the fraction value stored for the "ADJ" ASSOCIATION 744.

Figure 8:
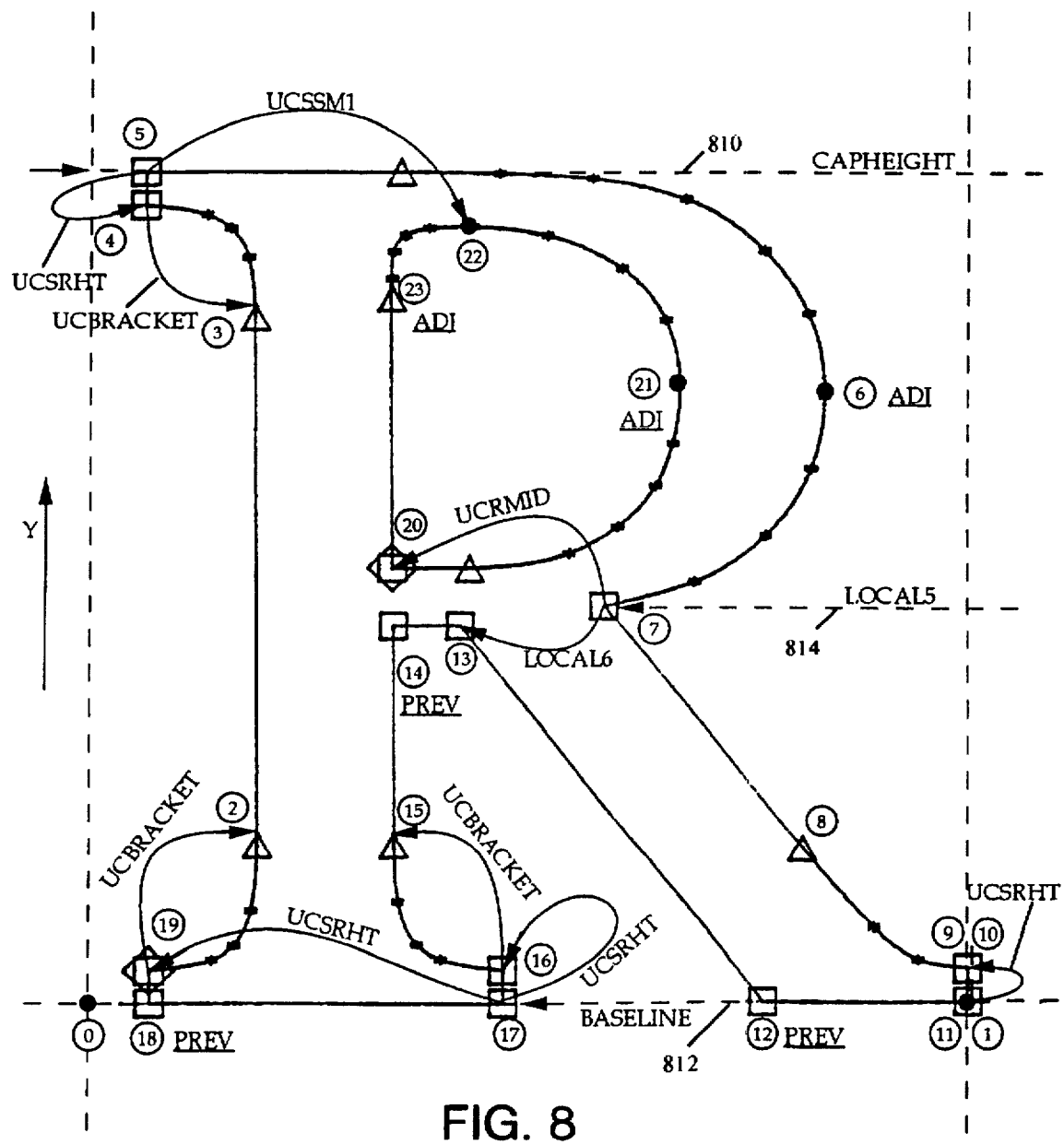
FIG. 8 shows a detailed view of the vertical elements of the character model of FIG. 6.

FIG. 8 shows the equivalent detailed view of the vertical elements of the CHARACTER MODEL of FIG. 6. In the Figure, the lines labeled "CAPHEIGHT" 810, and "BASELINE" 812 represent standard fontwide vertical associations aimed at achieving a uniform appearance along a horizontal row of text Only those applicable to the given CHARACTER need be defined in the CHARACTER MODEL. The method used to determine the y-coordinates of each SEGMENT ENDPOINT is analogous to that described above for the horizontal coordinates, with the exception that the ASSOCIATION network for the vertical direction need not be connected, but instead can be comprised of a plurality of sub-networks, each with its own starting y-coordinate. For example, the starting y-coordinate for points 11 and 17 is the value of line BASE-LINE 812, and that for point 5 is the value of the line CAPHEIGHT 810. The starting y-coordinate for point 13 is the fraction of the vertical distance between BASELINE 812 and CAPHEIGHT 810 as defined by the local dimension value LOCAL5 814.

Contour Segment Reconstruction

Figure 9:
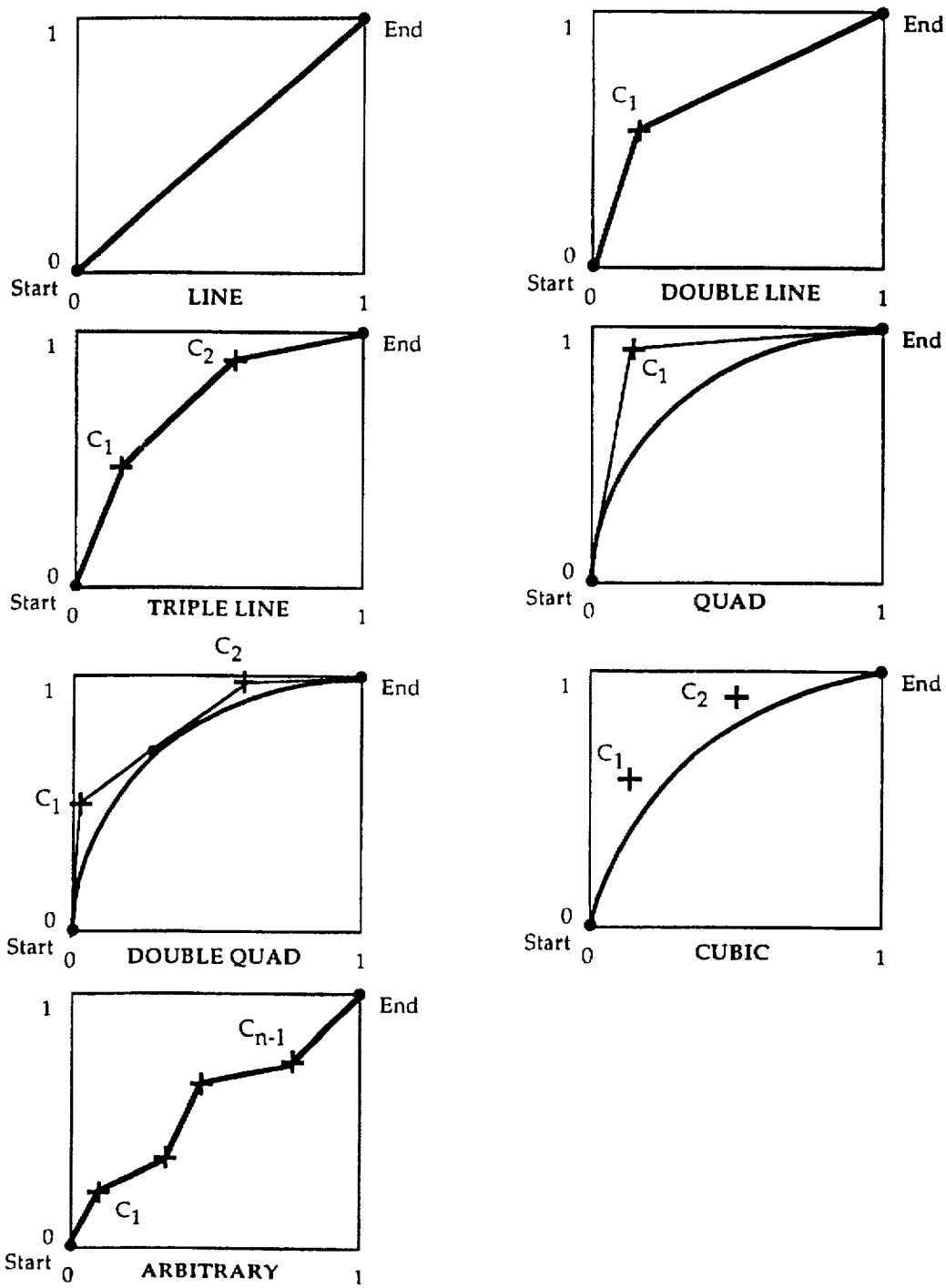
FIG. 9 shows representative normalized contour segment types with illustration of the parameters used for their characterization.

FIG. 9 shows a representative set of NORMALIZED CONTOUR SEGMENT types, shown in an abstract form in which each line drawn begins at the point with coordinate pair (0, 0) and ends at the point with coordinate pair (1,1). In the Figure, each type is shown with the start and end coordinate points together with examples of control points used for definition of an actual contour of that type (designated "$C_1$", "$C_2$", etc.). In the preferred embodiment of the invention, the following CONTOUR SEGMENT types are defined and are indicated with small capitalization along with other defined terms set forth previously and applicable to the remaining text and claims:

1. A LINE is a CONTOUR SEGMENT comprising a straight line drawn between the starting point and the ending point.
2. A DOUBLE LINE is a connected sequence of two straight lines with a single parameter given representing the endpoint of the first straight line and the starting point of the second straight line.

3. A TRIPLE LINE is a connected sequence of three straight lines with two parameters given representing the endpoints of the first and second straight lines respectively.

4. A QUAD is a CONTOUR SEGMENT comprising a quadratic Bezièr curve with a single parameter given representing the intersection of the two lines tangent to the curve at the start and endpoints, referred to as the control point the QUAD.

5. A DOUBLE QUAD is a connected sequence of two QUADS with two parameters given representing the control points of the first and second QUADS respectively. The midpoint of the two control points is the endpoint of the first QUAD and the starting point of the second QUAD.

6. A CUBIC is a CONTOUR SEGMENT comprising a cubic Bezier curve with two parameters given representing the cubic Bezier control points for the curve.

7. An ARBITRARY CONTOUR SEGMENT is a connected sequence of a number N of straight lines, where N is an arbitrarily large number, with N-1 parameters given representing the endpoints of the first through the N-1th straight line of the sequence.

It should be noted that the above types used in the preferred embodiment of the invention are examples of types which can be defined. It will be apparent to one skilled in the art that an unlimited number of additional types, including combinations of those listed above, can be defined.

As defined previously, a NORMALIZED CONTOUR SEGMENT is a parametric description of a CONTOUR SEGMENT between two constant points (taken in the preferred embodiment to be (0, 0) and (1, 1) as stated above) with the segment type and given parameters being stored as SEGMENT DESCRIPTORS. This data comprises: (1) the identifier of the NORMALIZED CONTOUR SEGMENT type (e.g. "DOUBLE LINE"); and, (2) coordinate pairs for the parameters (if any) associated with the type as defined above. With the exception of the type "ARBITRARY CONTOUR SEGMENT", the number of given coordinate pairs is two or less, and the data required for characterization of a CONTOUR SEGMENT is normally stored in a minimum of one and maximum of 5 numeric quantities.

Figure 10A:
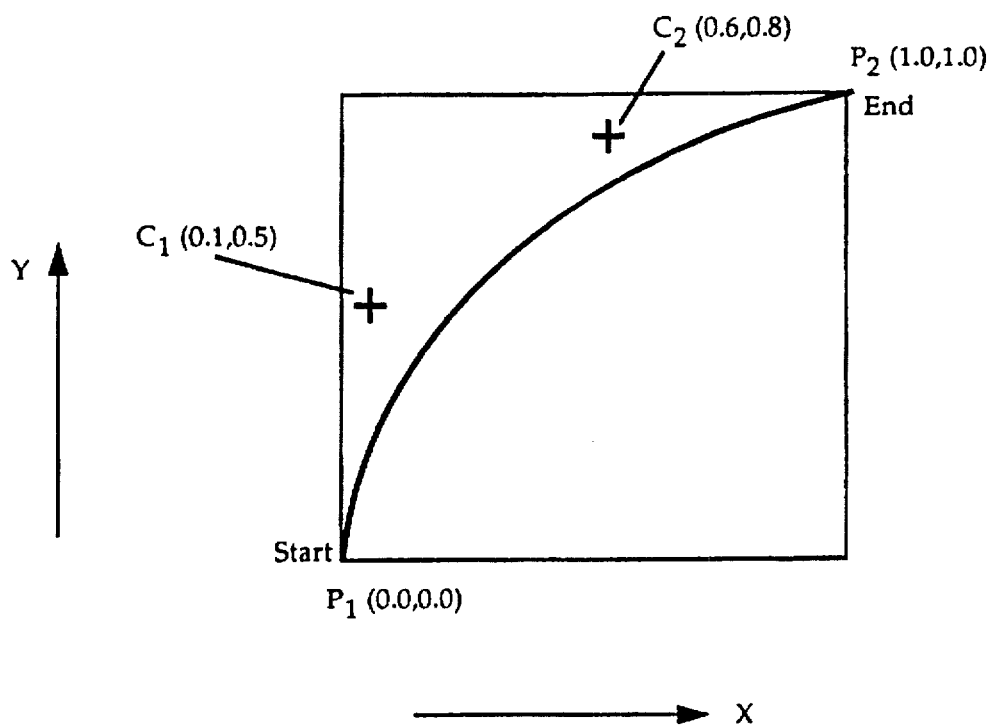
FIG. 10A and FIG. 10B provide an example of reconstruction of an actual outline segment for a given segment parameter set.
Figure 10B:
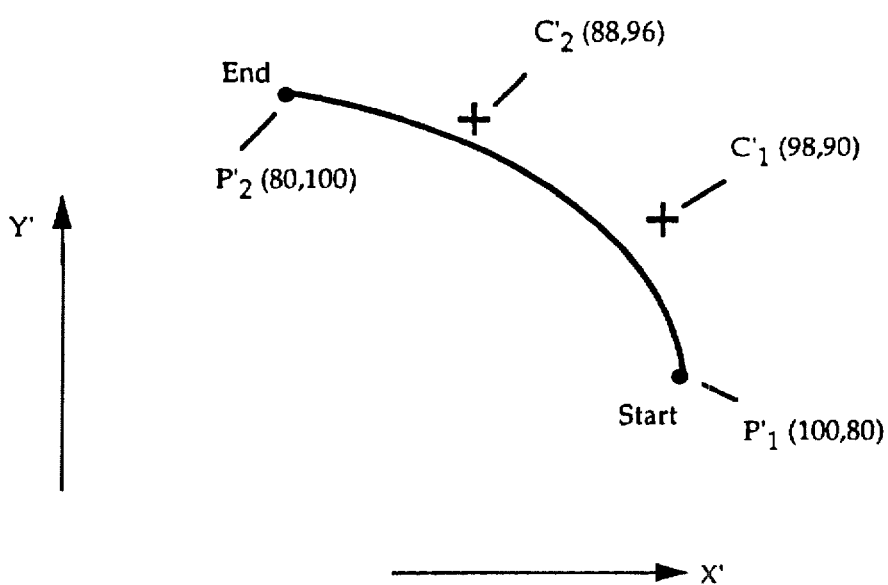

Reconstruction of an actual CONTOUR SEGMENT from a NORMALIZED CONTOUR SEGMENT is illustrated by example in FIG. 10A and FIG. 10B for a CONTOUR SEGMENT between two SEGMENT ENDPOINTS $P'_1$ and $P'_2$ with output coordinate values (80, 100) and (100, 80) respectively. Let the NORMALIZED CONTOUR SEGMENT stored be a CUBIC, and the two given parameters, corresponding to the Bezièr control points of a cubic Bezier curve, be $C_1=(0.1, 0.5)$ and $C_2=(0.6, 0.8)$. The coordinates of a point (X, Y) in the output coordinate space can be obtained from the corresponding coordinates of the point (X, Y) in the normalized space by the scaling transformation:

$$X'=X'_1+X*(X'_2-X'_1) \quad [1]$$

$$Y'=Y'_1+Y*(Y'_2-Y'_1)$$

Using equation [1] with the given parameters $C_1$ and $C_2$ yields the corresponding control points in the output space $C'_1$ and $C'_2$ with the scaled coordinates (98, 90) and (88,96) respectively:

$$X_{C_1}' = 100 + X_{C_1} * (80 - 100) = 100 + 0.1 * (-20) = 98 \quad [2]$$

$$Y_{C_1}' = 80 + Y_{C_1} * (100 - 80) = 80 + 0.5 * (20) = 90$$

$$X_{C_2}' = 100 + X_{C_2} * (80 - 100) = 100 + 0.6 * (-20) = 88$$

$$Y_{C_2}' = 80 + Y_{C_2} * (100 - 80) = 80 + 0.8 * (20) = 96$$

Given the start and endpoints $P'_1$ and $P'_2$ and the two control points $C'_1$ and $C'_2$, the exact Bezièr curve can be rendered according to procedures well known in the art.

Replication Accuracy

Figure 11:
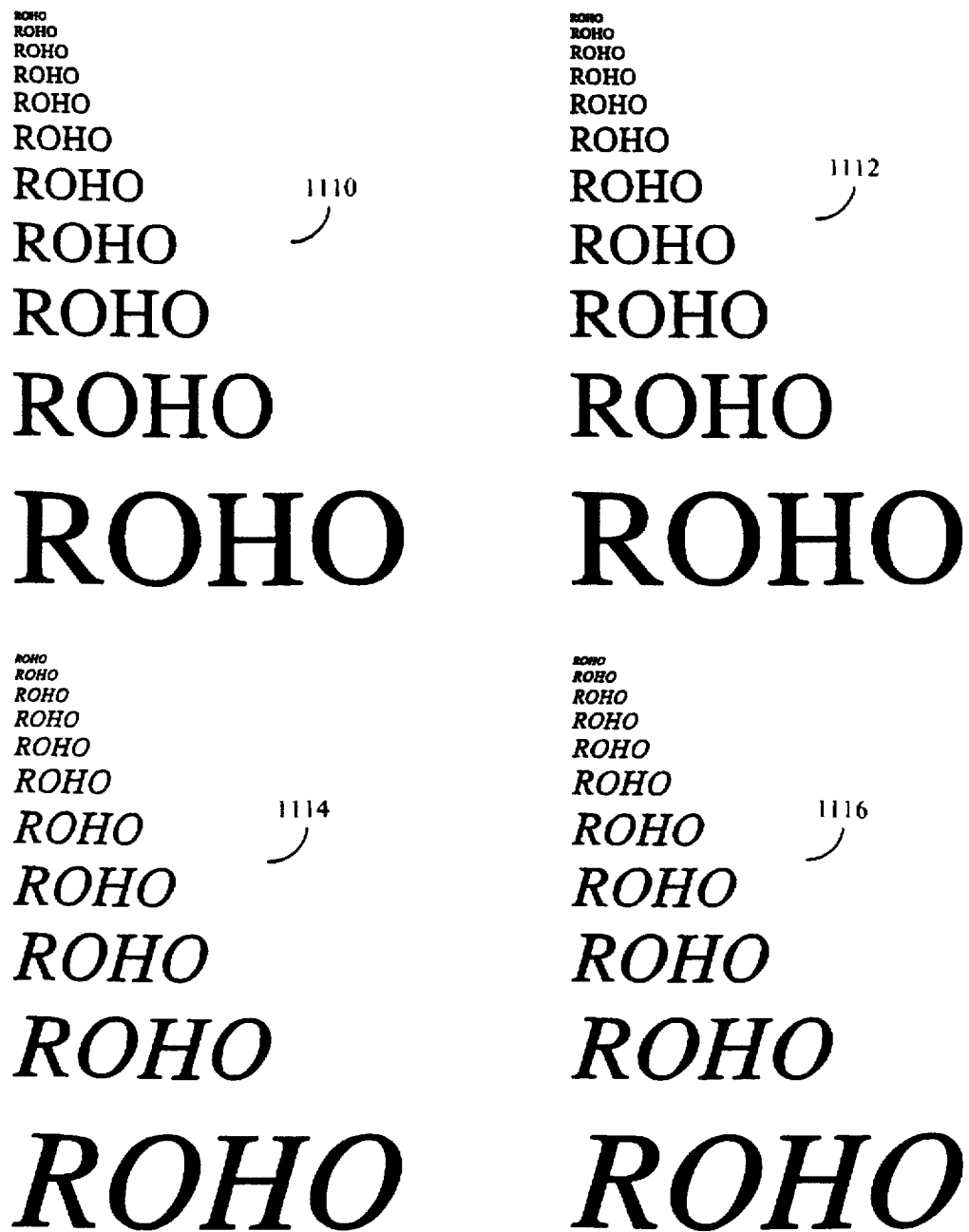
FIG. 11 compares the printed results obtained using the method of the invention and a reference scaleable font data storage method for two typeface designs.

The ability of the method to replicate the results of traditional scaleable font storage and retrieval methods is shown in FIG. 11 in which the same set of characters are rendered for a number of point sizes, in two standard TYPEFACE DESIGNS, using the method of the invention (left column) and the standard INTELLIFONT scaleable font database (right column). The top left set 1110 is the output for the CG-TIMES TYPEFACE DESIGN as stored, retrieved, and rendered using the method and apparatus of the preferred embodiment described herein. The top right comparison set 1112 was obtained from data stored, retrieved, and rendered using the standard INTELLIFONT system. The lower left set 1114 and lower right set 1116 are the corresponding output results for the CG-TIMES ITALIC TYPEFACE DESIGN.

Data Compression Results

The data compression resulting from the method of the invention results from two important effects: (1) the ability to re-use the CHARACTER MODEL; and, (2) the use of one set of contour points, i.e., the SEGMENT ENDPOINTS, to serve the dual purpose of outline reconstruction and hint-based PIXELMAP GRID ALIGNMENT. FIG. 12 shows an example of a model group comprising the set of CHARACTER MODELS used for various TYPEFACE DESIGNS for the letter "H" (having ASCII CHARACTER CODE=072). In the figure, the "ALBERTUS" TYPEFACE DESIGNS are trademarks of Monotype, Inc., "MARIGOLD" of Alpha Omega, Inc., "UNIVERS" of Linotype AG and/or its subsidiaries, "ANTIQUE OLIVE" of Olive, Inc., and "CG OMEGA" and "CG TIMES" of Miles Inc., Agfa Division. All other TYPEFACE DESIGNS have names which are in the public domain.

Within the model group of FIG. 12, a total of 12 CHARACTER MODELS are needed to reconstruct the letter "H" for the 35 TYPEFACE DESIGNS shown. The CHARACTER MODELS with model index 1 and 2 (designated as "Model 1" and "Model 2" respectively in FIG. 12) together represent 15 TYPEFACE DESIGNS. A different model group exists for each text graphic object uniquely identified by a CHARACTER CODE, and the number of CHARACTER MODELS required to span the full set of TYPEFACE DESIGNS depends upon the variability of the shape of the object As an example, a minimum of four CHARACTER MODELS are needed to represent the lower case letter "a" (ASCII CHARACTER CODE=097) in both "single story" and "double story" Roman and Italic forms. For the letter "O" (ASCII CHARACTER CODE=079) however, only three CHARACTER MODELS are required to represent the same 35 typeface designs shown in FIG. 12.

According to the above discussion, the average ratio of TYPEFACE DESIGNS to the number of distinct CHARACTER MODELS required to reconstruct them is about three. Re-use of the contour point data yields another factor of two, leading to an average compression ratio of approximately six as a direct result of using the method. Additional data storage savings are achieved in the preferred embodiment of the invention by using other content compression techniques well known in the art, e.g., using single-byte index values to represent the ASSOCIATIONS, for which DIMENSION data values are stored to higher precision only once for each TYPEFACE DESIGN. The final result for the preferred embodiment of the invention is indicated by a storage requirement of approximately 500 Kbytes for a collection of 45 TYPEFACE DESIGNS realized using the method, vs. approximately 3 MBytes of storage required for the same collection of TYPEFACE DESIGNS using the standard INTELLIFONT scaleable font database methodology, therefore yielding an effective ratio of about 6:1.

Compound Graphic Objects

The preferred embodiment shown in the Figures and described above makes use of a one-to-one relationship between CHARACTERS and CHARACTER MODELS, i.e., individual CHARACTERS are constructed each from a single CHARACTER MODEL using procedures as previously described. It is also possible to produce compound graphic objects, e.g., compound characters, by use of more than one CHARACTER MODEL in combination. For example, the addition of a diacritical mark to a CHARACTER (such as an umlaut to the letter "U") yields a distinct CHARACTER with a unique CHARACTER CODE in a CHARACTER SET. The new CHARACTER is otherwise identical to that without the diacritical mark. The generation of the umlauted CHARACTER is thus accomplished using the CHARACTER MODEL of the non-umlauted CHARACTER together with a CHARACTER MODEL for the umlaut alone. As used herein, the defined term CHARACTER SUB-MODEL shall mean a CHARACTER MODEL in a hierarchical combination of CHARACTER MODELS which together describes a complete CHARACTER. This hierarchical combination is called out in the decoding of the text character 510 of FIG. 5 based upon the character ID 516 and the typeface design ID 514, with the addition of ASSOCIATIONS used for transformation (relative positioning, scaling, rotation, etc.) of the individual CHARACTER SUB-MODELS. Although combination is used in the described preferred embodiment only for compound characters such as diacritical characters, there is no limit to the number of CHARACTER SUB-MODELS or the number of hierarchical levels with which this combination can take place. For example, it is feasible, through the use of CHARACTER SUB-MODELS, to construct CHARACTERS entirely from components, thereby achieving further content compression. While this approach is useful for the Latin TYPEFACE DESIGNS, it produces significant results in those Asian languages wherein a large number of characters are built up of combinations of "radicals", each combination of which is represented by a CHARACTER SUB-MODEL. Each such CHARACTER SUB-MODEL is independently transformed (i.e., positioned, non-linearly scaled, rotated, etc.) and combined with others to produce a single CHARACTER.

Synthesis of New Characters and Fonts

The primary objective of the method of the invention is efficient storage and retrieval of data representing a scaleable font, providing for scaled character output without loss of accuracy with respect to any TYPEFACE DESIGN stored in the database. In addition, new TYPEFACE DESIGNS can be created by systematic modification of the parameters associated with one or more TYPEFACE DESIGNS already stored, thereby synthesizing a new font For example, consider the ASSOCIATION UCXSM1 742 of the character shown in FIG. 7, representing the upper-case vertical stem width. Scaling the DIMENSIONS of this and related ASSOCIATIONS for a single TYPEFACE DESIGN by a factor of 1.2 would create a new design for which some horizontal measurements have been broadened by 20% while others remain unchanged. Interpolation between DIMENSIONS corresponding to the same ASSOCIATIONS of two TYPEFACE DESIGNS, such as for example bold or non-bold versions of a TYPEFACE DESIGN, would have the effect of creating a "semi-bold" version of the same TYPEFACE DESIGN. No changes to the processing methods are involved other than pre-processing of the typeface global data used for the character generation.

Just as new characters and fonts can be synthesized by systematic manipulation of DIMENSIONS, similar procedures can be applied to SEGMENT DESCRIPTOR data. Altering the positions of the control points of a CUBIC, for example, would create a different shape for the CONTOUR SEGMENT reconstructed for it.

Construction of the Scaleable Font Database

Since the method of the invention is data-driven, the procedure for constructing a SCALEABLE FONT DATABASE to be used with the preferred embodiment of the invention is achieved through the definition of data sets to be used by the outline reconstruction module 410 of FIG. 4, using the understanding of the art of typeface design, the rules for defining the ASSOCIATIONS, and the rules for entry and formatting of the data. These rules are based upon the TYPEFACE DESIGN art, along with an understanding of the behavior of text graphics in the high and low resolution domains. CHARACTERS for an entirely new TYPEFACE DESIGN can be created and added to an existing font collection without any other changes to the system. Similarly, entirely new CHARACTERS can be created for existing TYPEFACE DESIGNS, through the assignment of valid CHARACTER CODES and updating the TYPEFACE DESIGN datasets as necessary.

Figure 13:
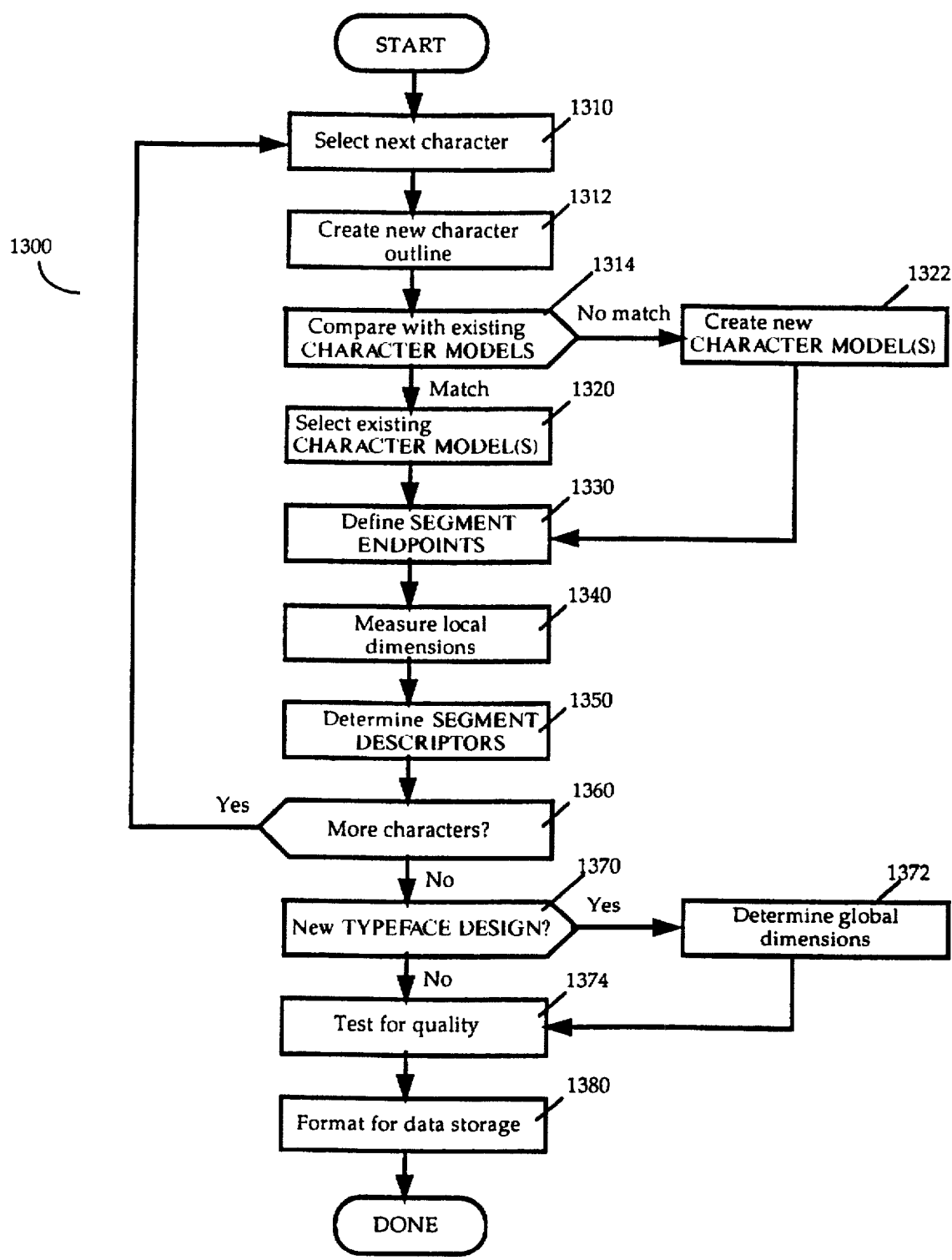

The processing steps for construction of a new or augmented SCALEABLE FONT DATABASE are shown in the flowchart of FIG. 13. Each of the SCALEABLE CHARACTERS to be used in a new SCALEABLE FONT DATABASE or added to an existing SCALEABLE FONT DATABASE is processed in a loop 1300 described as follows.

For each SCALEABLE CHARACTER in sequence, the text character is first selected (Box 1310) and identified with respect to its CHARACTER CODE within a chosen CHARACTER SET. A CHARACTER OUTLINE is created for this CHARACTER using well known automated or manual digitizing techniques (Box 1312). In many cases, the CHARACTER already exists in a suitable digital format (e.g., as a dataset formatted by the IKARUS typeface design system).

The existing collection of CHARACTER MODELS is visually scanned (Box 1314) for applicability to the new CHARACTER OUTLINE obtained in step 1312. In the case of compound characters or CHARACTER OUTLINES suitable for hierarchical combination as previously described, existing CHARACTER MODELS and/or CHARACTER SUB-MODELS are considered as candidates for such a combination. If a match is found, the CHARACTER MODEL or combination of CHARACTER SUB-MODELS is selected as the CHARACTER MODEL for the new CHARACTER OUTLINE (Box 1320). If no match is found with an existing CHARACTER MODEL or combination of CHARACTER SUB-MODELS, a new CHARACTER MODEL or one or more of the set of component CHARACTER SUB-MODEL(S) is created (Box 1322) according to procedures described below.

Once a CHARACTER MODEL has been identified for the new CHARACTER OUTLINE, SEGMENT END-POINTS are defined (Box 1330) for the CHARACTER OUTLINE corresponding to the SEGMENT ENDPOINT NUMBERS of the applicable CHARACTER MODEL. Local DIMENSIONS corresponding to ASSOCIATIONS in the CHARACTER MODEL are measured (Box 1340) and recorded in the character local data. Finally, the SEGMENT DESCRIPTORS are determined (Box 1350) by use of a procedure applied to each CONTOUR SEGMENT of the CHARACTER OUTLINE.

If there are more characters in the set to be added to the SCALEABLE FONT DATABASE (Box 1360), the loop 1300 is repeated until all have been processed according to the previously described process.

If this is a new SCALEABLE FONT DATABASE, or a new TYPEFACE DESIGN in an existing scaleable font database (Box 1370) the global dimensions for the TYPEFACE DESIGN are determined (Box 1372) according to procedures described below. Otherwise, the new scaleable characters are tested for quality (Box 1374) by storing, retrieving, and reconstructing them using the method of the invention, and by visually comparing the reconstructed results with the original CHARACTER OUTLINE. Individual values are manually tuned in the dataset as necessary to achieve the best possible results. After verification of the newly created scaleable characters, the data entered for them is formatted (Box 1380) for storage and later retrieval.

Determination of Global Typeface Dimensions

The global dimensions for the TYPEFACE DESIGN are determined (Box 1372) by first measuring and recording all global dimensions called out by the CHARACTER MODELS used within the collection of scaleable characters belonging to the TYPEFACE DESIGN. Measurements of DIMENSIONS corresponding to the same identified ASSOCIATION appearing many times in the same or different characters (e.g., the measurements corresponding to the association "UCSLM1" 13720 of FIG. 7), generally yield a variety of slightly different values. Accordingly, the average value of each such DIMENSION is chosen as a candidate, to be verified and/or manually tuned during quality testing (Box 1374).

Creation of a New Character Model

The creation of a new CHARACTER MODEL (Box 1322) is accomplished according to the following procedure. First, a representation of the CHARACTER OUTLINE is generated. From this representation, SEGMENT END POINTS are located precisely and identified with SEGMENT ENDPOINT NUMBERS, and ASSOCIATIONS are defined relating the SEGMENT END POINTS in the same style as shown in FIG. 7 and FIG. 8, and this information is recorded in the CHARACTER MODEL dataset The ASSOCIATIONS are labeled according to their type. SPATIAL ASSOCIATIONS are given an abstract logical or global name (e.g. "LOCAL8" 740 or "UCSLM1" 720 in FIG. 7). NON-SPATIAL ASSOCIATONS are identified according to the function to be applied (e.g. "PREV", "ADJ", etc.). Finally, the parameters for each ASSOCIATION are established, including an indication of whether or not PIXELMAP GRID ALIGNMENT is to take place in application of the ASSOCIATION to determine its corresponding output SEGMENT END-POINT location. This information is entered as data, thereby completing the definition of the new CHARACTER MODEL.

Having described in detail a preferred embodiment of our invention, it will now be apparent to those skilled in the art that numerous modifications can be made therein without departing from the scope of the invention as defined in the following claims.

What we claim is:

1. A method for construction of a SCALEABLE FONT DATABASE comprising the following steps:

(A) Selecting a CHARACTER from a set of one or more CHARACTERS to be stored in said SCALEABLE FONT DATABASE;

(B) Assigning a CHARACTER CODE to said CHARACTER;

(C) Creating a CHARACTER OUTLINE for said CHARACTER;

(D) Obtaining a CHARACTER MODEL for said CHARACTER;

(E) Determining SEGMENT ENDPOINTS in said CHARACTER MODEL using said CHARACTER OUTLINE;

(F) Measuring local DIMENSIONS for corresponding ASSOCIATIONS in said CHARACTER MODEL;

(G) Determining SEGMENT DESCRIPTORS for each CONTOUR SEGMENT of said CHARACTER OUTLINE;

(H) Repeating steps (A) through (G) for any remaining CHARACTERS of said set of one of one or more CHARACTERS;

(I) Determining global DIMENSIONS applicable to said set of one or more CHARACTERS;

(J) Formatting said CHARACTER CODE, CHARACTER MODEL, local DIMENSIONS, and SEGMENT DESCRIPTORS for each of said CHARACTERS together with said global DIMENSIONS to form STORED SCALEABLE CHARACTERS comprising said SCALEABLE FONT DATABASE; and, (K) Storing the SCALEABLE FONT DATABASE on a machine readable medium for subsequent use in a computer to produce on an output medium characters of a selected scale.

2. A method for generating STORED SCALEABLE CHARACTERS representing one or more CHARACTERS, said STORED SCALEABLE CHARACTERS to be included in a previously constructed SCALEABLE FONT DATABASE that is stored on a machine readable medium for subsecuent use in a computer to produce on an output medium characters of a selected scale, said method comprising the following steps:

(A) Selecting a CHARACTER from said set of one or more CHARACTERS;

(B) Assigning a CHARACTER CODE to said CHARACTER;

(C) Creating a CHARACTER OUTLINE for said CHARACTER;

(D) Obtaining a CHARACTER MODEL for said CHARACTER;

(E) Determining SEGMENT ENDPOINTS in said CHARACTER MODEL using said CHARACTER OUTLINE;

(F) Measuring local DIMENSIONS for corresponding ASSOCIATIONS in said CHARACTER MODEL;

(G) Determining SEGMENT DESCRIPTORS for each CONTOUR SEGMENT of said CHARACTER OUTLINE;

(H) Repeating steps (A) through (G) for any remaining CHARACTERS of said set of one or more CHARACTERS;

(I) Determining global DIMENSIONS applicable to said set of one or more CHARACTERS;

(J) Formatting said CHARACTER CODE, CHARACTER MODEL, local DIMENSIONS, and SEGMENT DESCRIPTORS for each of said CHARACTERS together with said global DIMENSIONS to form said STORED SCALEABLE CHARACTERS to be included in said previously-constructed SCALEABLE FONT DATABASE; and, (K) Including said STORE SCALEABLE CHARACTERS in the previously-constructed SCALEABLE FONT DATABASE.

3. A method for generating a STORED SCALEABLE CHARACTER comprising the following steps:

(A) Assigning a CHARACTER CODE to said CHARACTER;

(B) Creating a CHARACTER OUTLINE for said CHARACTER;

(C) Obtaining a CHARACTER MODEL for said CHARACTER;

(D) Determining SEGMENT ENDPOINTS in said CHARACTER MODEL using said CHARACTER OUTLINE;

(E) Measuring local DIMENSIONS for corresponding ASSOCIATIONS in said CHARACTER MODEL;

(F) Determining SEGMENT DESCRIPTORS for each CONTOUR SEGMENT of said CHARACTER OUTLINE;

(G) Determining global DIMENSIONS applicable to said CHARACTER; and (H) Formatting said CHARACTER CODE, CHARACTER MODEL, local DIMENSIONS, and SEGMENT DESCRIPTORS for said CHARACTER together with said global DIMENSIONS to form said STORED SCALEABLE CHARACTER (I) Storing said STORED SCALEABLE CHARACTER on a machine readable medium for subsequent use in a computer to produce on an output medium the STORED SCALEABLE CHARACTER at a selected scale.

4. The method of claims 1, or 3 wherein said CHARACTER MODEL comprises a plurality of CHARACTER SUB-MODELS, together with ASSOCIATIONS defining an inter-relationship of said plurality of CHARACTER SUB-MODELS.

5. The method of claims 1, or 3 wherein at least one of the CHARACTER MODELS is determined from a CHARACTER OUTLINE by selection from a set of previously-created CHARACTER MODELS, said selection being based upon comparison of said CHARACTER OUTLINE with each of said set of previously-created CHARACTER MODELS.

6. The method of claims 1, or 3 wherein at least one of the CHARACTER MODELS is determined from a CHARACTER OUTLINE by creating a new CHARACTER MODEL using said CHARACTER OUTLINE.

7. The method of claims 1, or 3 wherein at least one of the global DIMENSIONS is determined by selection from a previously-created set of measurements for global DIMENSIONS.

8. The method of claims 1, 2, or 3 wherein at least one of the global DIMENSIONS is determined by creating a new measurement for one or more global DIMENSIONS.

9. A method for construction of a CHARACTER MODEL for a CHARACTER comprising the following steps:

(A) Generating a representation of a CHARACTER OUTLINE for said CHARACTER;

(B) Locating SEGMENT ENDPOINTS on said representation of said CHARACTER OUTLINE;

(C) Identifying said SEGMENT ENDPOINTS with SEGMENT ENDPOINT NUMBERS;

(D) Identifying ASSOCIATIONS relating said SEGMENT ENDPOINTS;

(E) Determining parameters for each of said ASSOCIATIONS;

(F) Collecting said SEGMENT ENDPOINT NUMBERS and said ASSOCIATIONS to form said CHARACTER MODEL for said CHARACTER; and, (G) Storing said SEGMENT ENDPOINT NUMBERS and said ASSOCIATIONS on a machine readable medium for subsequent use in a computer.

10. A method for construction of a CHARACTER SUB-MODEL representative of a component of a CHARACTER, said method comprising the following steps:

(A) Generating a representation of a CHARACTER OUTLINE for said component of said CHARACTER;

(B) Locating SEGMENT ENDPOINTS on said representation of said CHARACTER OUTLINE;

(C) Identifying said SEGMENT ENDPOINTS with SEGMENT ENDPOINT NUMBERS;

(D) Identifying ASSOCIATIONS relating said SEGMENT ENDPOINTS;

(E) Determining parameters for each of said ASSOCIATIONS;

(F) Collecting said SEGMENT ENDPOINT NUMBERS and said ASSOCIATIONS to form said CHARACTER SUB-MODEL for said component of said CHARACTER; and, (G) Storing said SEGMENT ENDPOINT NUMBERS and said ASSOCIATIONS on a machine readable medium for subsequent use in a computer.

11. A method for construction of a CHARACTER MODEL for a CHARACTER comprising the following steps:

(A) Generating a representation of a CHARACTER OUTLINE for said CHARACTER;

(B) Locating SEGMENT ENDPOINTS on said representation of said CHARACTER OUTLINE;

(C) Identifying said SEGMENT ENDPOINTS with SEGMENT ENDPOINT NUMBERS;

(D) Identifying ASSOCIATIONS relating said SEGMENT ENDPOINTS;

(E) Determining CHARACTER SUB-MODELS applicable to subsets of said SEGMENT ENDPOINTS and said ASSOCIATIONS;

(F) Determining ASSOCIATIONS relating said CHARACTER SUB-MODELS;

(G) Collecting said CHARACTER SUB-MODELS and said ASSOCIATIONS relating said CHARACTER SUB-MODELS to form said CHARACTER MODEL for said CHARACTER; and, (H) Storing said CHARACTER SUB-MODELS and said ASSOCIATIONS on a machine readable medium for subsecuent use in a computer.

12. A method for determining a global dimension applicable to a plurality of stored scaleable characters representing characters belonging to one or more typeface designs, comprising the following steps:

(A) selecting a typeface design from said one or more typeface designs;

(B) selecting a character belonging to the typeface design selected in step (A);

(C) measuring actual dimensions for each occurrence of an association corresponding to said global dimension within a character model of said character;

(D) repeating steps (B) and (C) for any remaining characters belonging to said typeface design;

(E) forming a candidate global dimension as an average value of the measurement of step (C);

(F) adjusting said candidate global dimension to obtain the closest fit for all characters belonging to said typeface design thereby obtaining the global dimension applicable to said typeface design;

(G) repeating steps (A) through (F) for any remaining typeface designs of said one or more typeface designs; and, (H) storing the global dimension or global dimensions obtained in step (F) on a machine readable medium for subsequent use in a computer.

* * * * *